United States Patent
Fujita et al.

(10) Patent No.: US 6,926,358 B2
(45) Date of Patent: Aug. 9, 2005

(54) IMPACT ABSORBING STRUCTURE AND SEAT STRUCTURE

(75) Inventors: Etsunori Fujita, Hiroshima (JP); Yutaka Sakamoto, Hiroshima (JP); Yasuhide Takata, Hiroshima (JP)

(73) Assignee: Delta Tooling Co., Ltd., Hiroshima (JP)

(*) Notice: Subject to any disclaimer, the term of this patent is extended or adjusted under 35 U.S.C. 154(b) by 0 days.

(21) Appl. No.: 10/322,981

(22) Filed: Dec. 18, 2002

(65) Prior Publication Data

US 2003/0116999 A1 Jun. 26, 2003

(30) Foreign Application Priority Data

Dec. 20, 2001 (JP) ........................................ 2001-387111

(51) Int. Cl.[7] ................................................. B60N 2/42
(52) U.S. Cl. ............................. 297/216.14; 297/216.13; 297/452.29; 297/452.56
(58) Field of Search ........................ 297/452.56, 216.1, 297/216.11, 216.13, 216.14, 452.29, 452.2, 216.15, 216.16, 216.17

(56) References Cited

U.S. PATENT DOCUMENTS

| | | | | |
|---|---|---|---|---|
| 3,131,971 A | * | 5/1964 | Gunn ...................... | 297/446.2 |
| 5,013,089 A | * | 5/1991 | Abu-Isa et al. ........ | 297/452.64 |
| 5,054,845 A | * | 10/1991 | Vogel ..................... | 297/216.14 |
| 5,881,395 A | * | 3/1999 | Donzis .......................... | 2/455 |
| 6,302,487 B1 | * | 10/2001 | Fujita et al. ........... | 297/452.56 |
| 6,315,364 B1 | * | 11/2001 | Fujita et al. ........... | 297/452.56 |
| 6,485,103 B1 | * | 11/2002 | Yamada et al. ........ | 297/452.56 |

FOREIGN PATENT DOCUMENTS

| | | | | |
|---|---|---|---|---|
| EP | 1033098 A1 | * | 9/2000 | ........... A47C/27/00 |
| EP | 1036528 A1 | * | 9/2000 | ........... A47C/23/26 |

* cited by examiner

Primary Examiner—Peter M. Cuomo
Assistant Examiner—Stephen D'Adamo
(74) Attorney, Agent, or Firm—Steinberg & Raskin, P.C.

(57) ABSTRACT

The object of the present invention is to suppress rebound of a human body when receiving a large impact load accompanying a collision or the like. A back frame member 20 and a seat frame member 10 are individually formed by welding or caulking, and a link member 30 for connecting both is attached to the back frame member 20 and the seat frame member 10 by welding or caulking. Each of the frame members is provided with a cushioning member as a tension structure. Upon receipt of an impact vibration or an impact force at a predetermined magnitude or more, the tension of the cushioning member provided as the tension structure lowers to be able to exhibit high damping characteristics.

8 Claims, 19 Drawing Sheets

F I G. 1
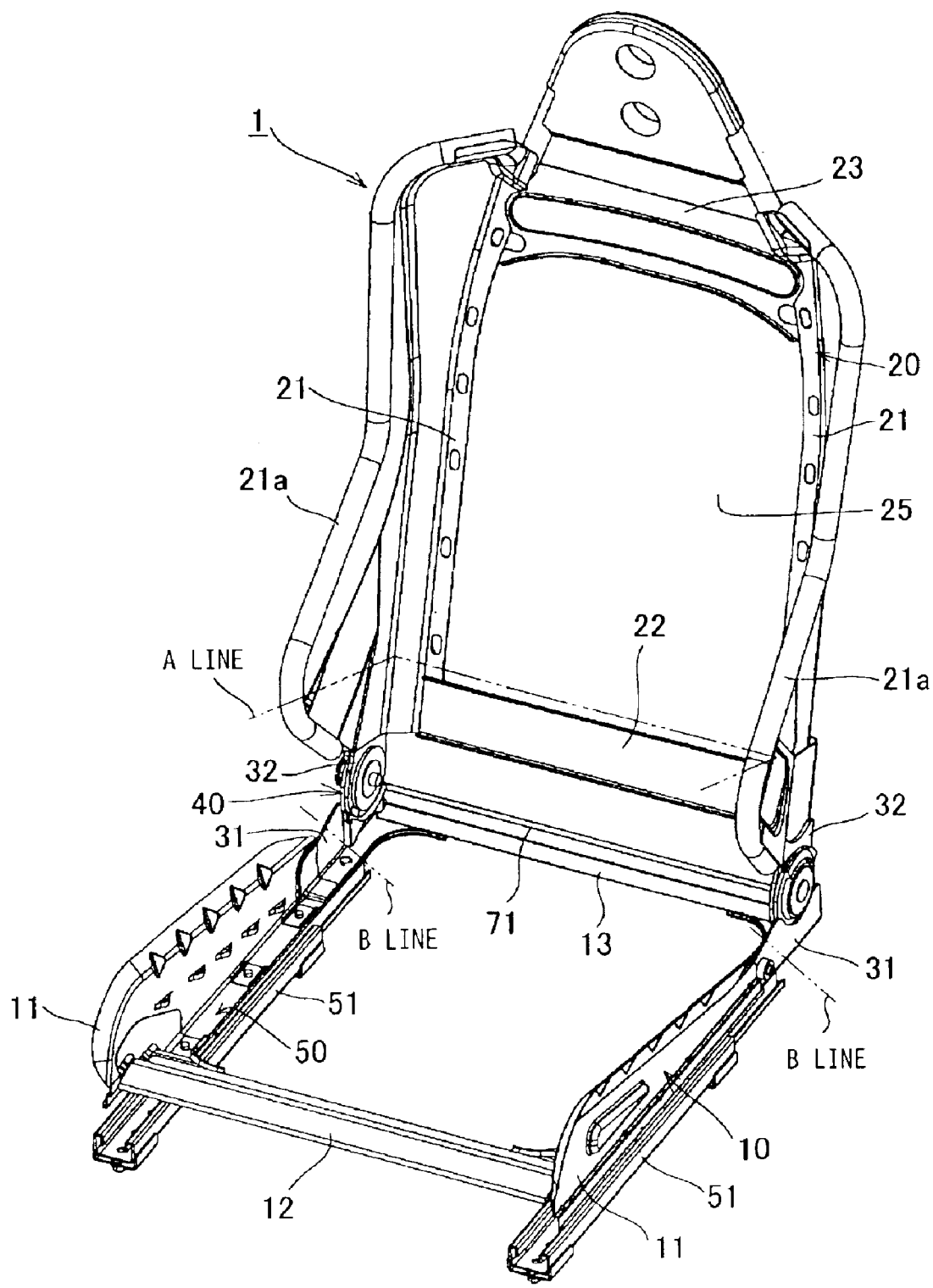

(DURING NORMAL USE)

F I G. 1 2
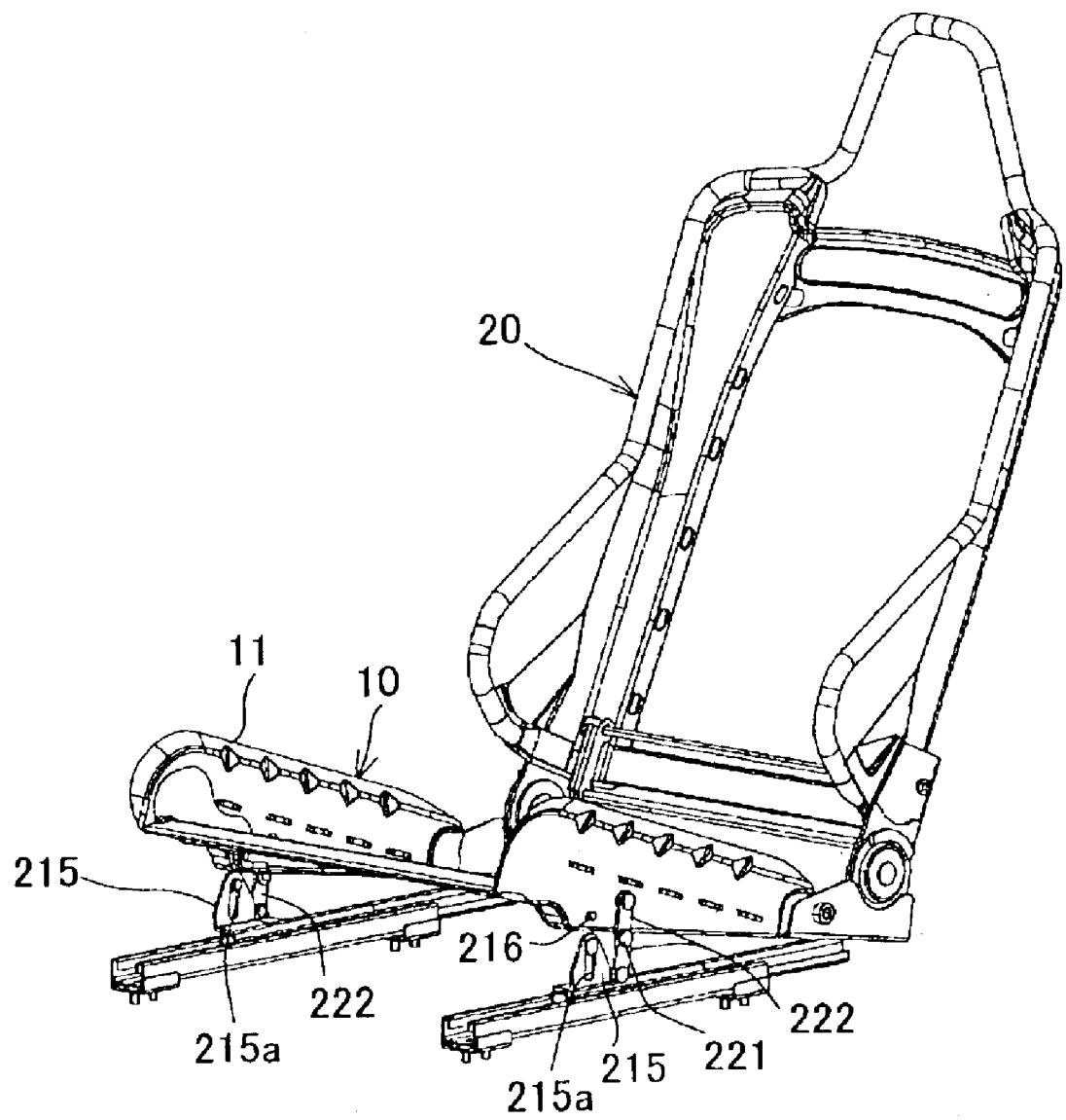

F I G. 1 7
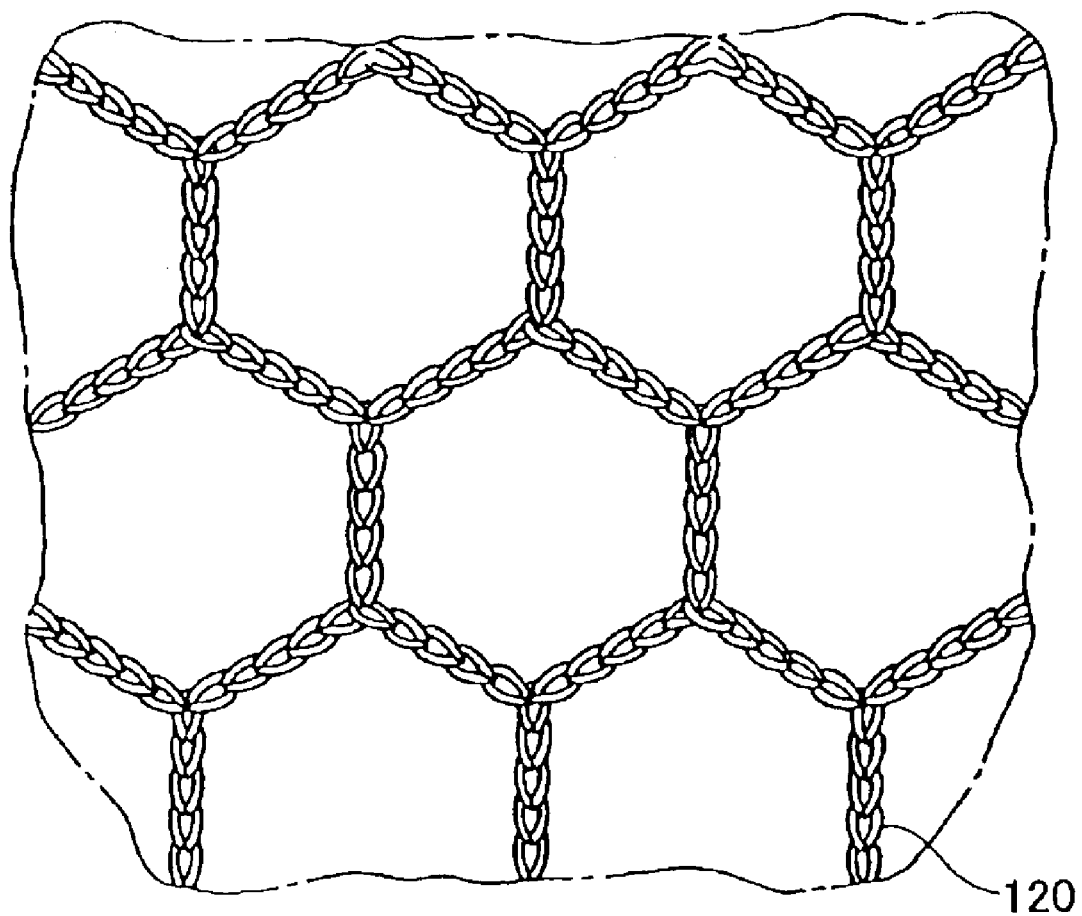

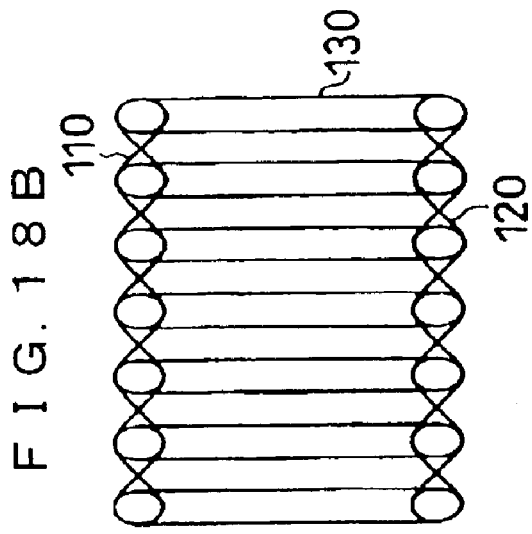
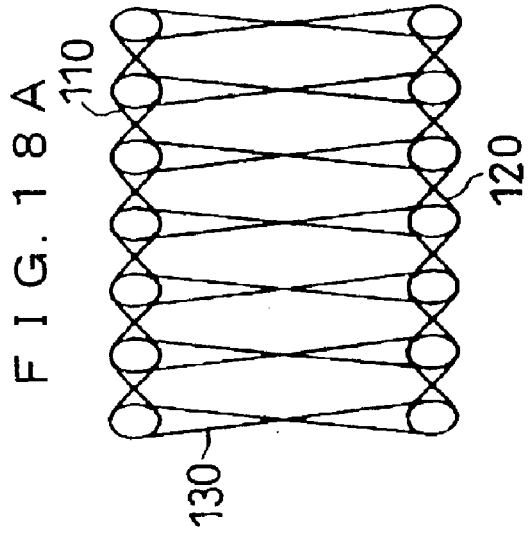
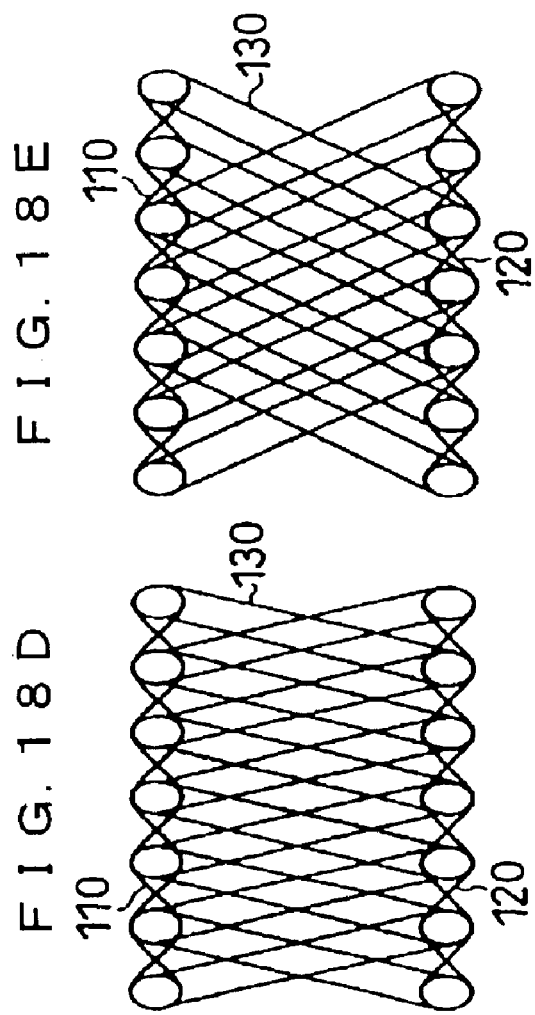
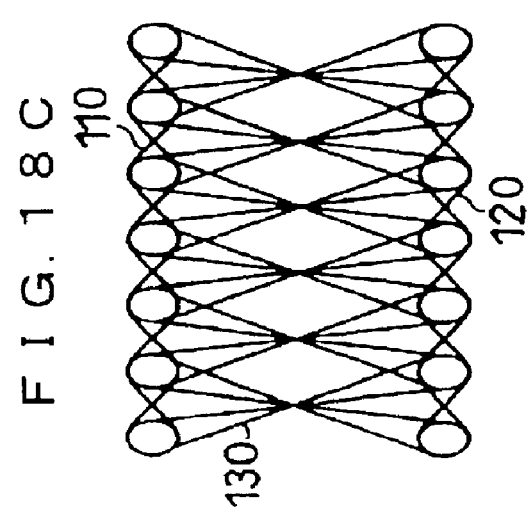

F I G. 1 9 A
BREAST PORTION ACCELERATION
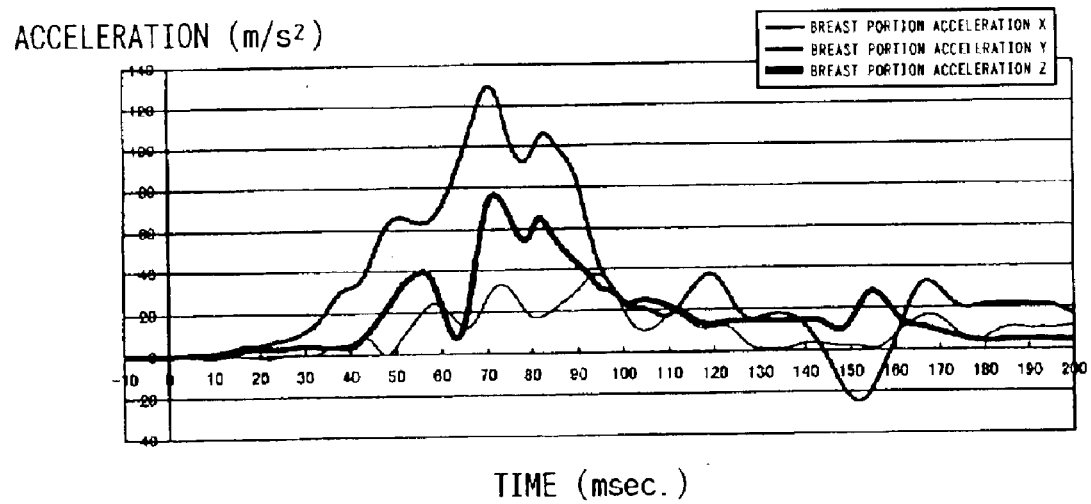
F I G. 1 9 B
WAIST PORTION ACCELERATION
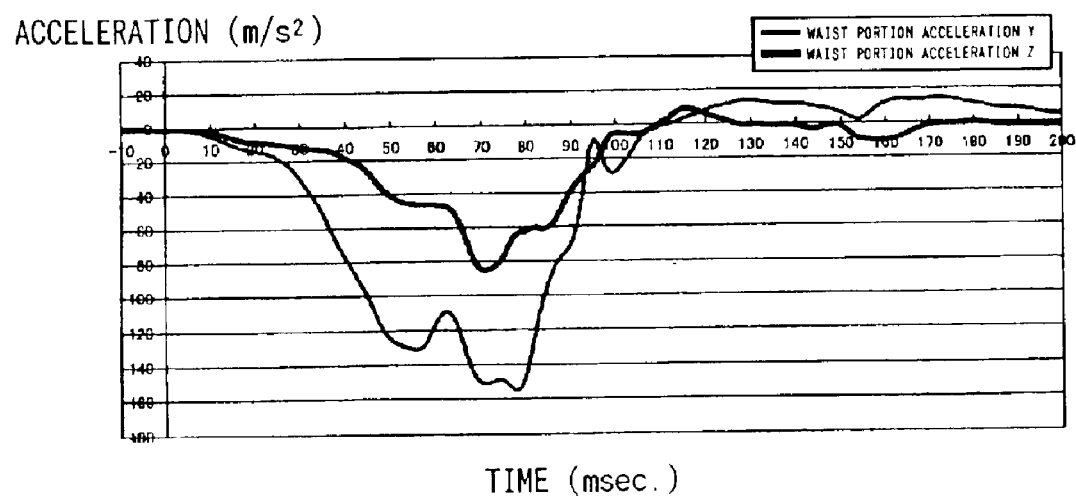

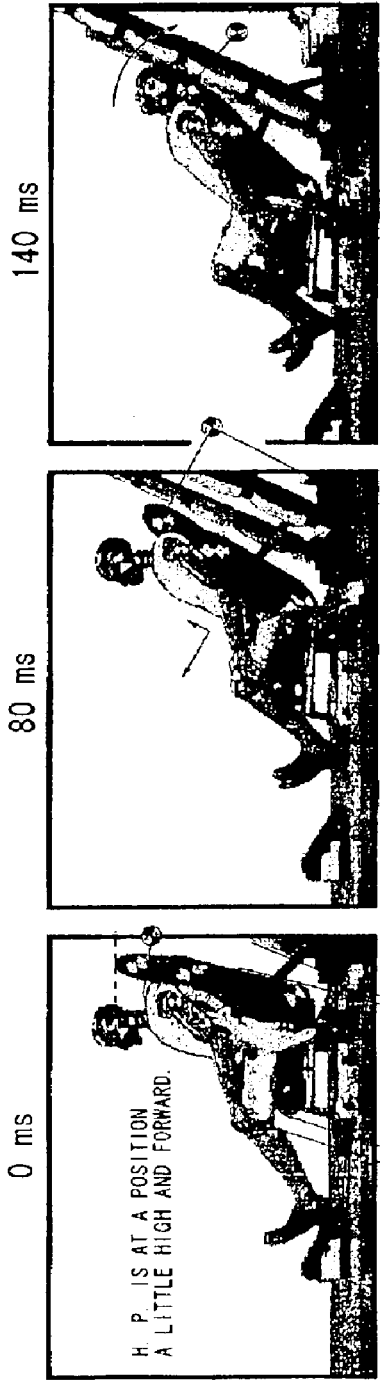

IMPACT ABSORBING STRUCTURE AND SEAT STRUCTURE

BACKGROUND OF THE INVENTION

1. Field of the Invention

The present invention relates to an impact absorbing structure and a seat structure particularly suitable as seats for transportation machines such as automobiles, trains, airplanes, and so on to which the impact absorbing structure is applied.

2. Description of the Related Art

Various mechanisms are used as an impact absorbing structure such as a cushioning material (mat) or the like used, for example, when a human body is transported at a predetermined acceleration such as at a time of emergency escape or at a time of a fall from a height, and as the abovementioned seat structure of automobiles and the like, in which it is required at all times to enhance an impact absorbing function by suppressing more effectively rebound of a human body upon receipt of an impact.

SUMMARY OF THE INVENTION

The present invention is made from the above viewpoint, and its object is to provide an impact absorbing structure capable of exhibiting high damping characteristics when receiving an impact vibration or an impact force at a predetermined magnitude or more, and a seat structure to which the impact absorbing structure is provided.

To achieve the object, the present invention provides an impact absorbing structure having a cushioning member provided as the tension structure with a tension field formed by being supported on a frame member, wherein upon receipt of an impact vibration or an impact force at a predetermined magnitude or more, the frame member deforms in a direction to reduce the tension of the tension structure.

The present invention provides an impact absorbing structure having a cushioning member provided as a tension structure with a tension field formed by being supported on a frame member, wherein at least a part of the cushioning member is provided in a state of contracting in a tangential direction of the cushioning member in a normal state, and upon receipt of an impact vibration or an impact force at a predetermined magnitude or more, the contraction state of the cushioning member is released.

The present invention provides an impact absorbing structure having a cushioning member provided as a tension structure with a tension field formed by being supported on a frame member, wherein at least a part of the cushioning member is provided in a state of contracting in a tangent direction of the cushioning member in a normal state, and wherein upon receipt of an impact vibration or an impact force at a predetermined magnitude or more, the contraction state of the cushioning member is released, and the frame member deforms in a direction to reduce the tension of the tension structure.

The present invention provides the impact absorbing structure according to above, wherein the frame members disposed with a predetermined distance therebetween with the tension structure put up thereon deform in a direction to get closer to each other upon receipt of an impact vibration or an impact force at a predetermined magnitude or more.

The present invention provides the impact absorbing structure according to above, wherein the cushioning member is formed of a three-dimensional net member formed by connecting together a pair of ground knitted fabrics disposed apart from each other using connecting fibers, or a structure with urethane comprising a two-dimensional fabric or a two-dimensional knitting and a urethane layer layered on the two-dimensional fabric or the two-dimensional knitting.

The present invention provides a seat structure, comprising: a back frame member; a seat frame member; and a cushioning member provided as a tension structure with a tension field formed by being supported on each of the frame members, wherein upon receipt of an impact vibration or an impact force at a predetermined magnitude or more, at least one of the frame members deforms in a direction to reduce the tension of the tension structure.

The present invention provides a seat structure, comprising: a back frame member; a seat frame member; and a cushioning member provided as a tension structure with a tension field formed by being supported on each of the frame members, wherein at least a part of the cushioning member is provided in a state of contracting in a tangential direction of the cushioning member in a normal state, and upon receipt of an impact vibration or an impact force at a predetermined magnitude or more, the contraction state of the cushioning member is released.

The present invention provides a seat structure, comprising: a back frame member; a seat frame member; and a cushioning member provided as a tension structure with a tension field formed by being supported on each of the frame members, wherein at least a part of the cushioning member is provided in a state of contracting in a tangent direction of the cushioning member in a normal state, and wherein upon receipt of an impact vibration or an impact force at a predetermined magnitude or more, the contraction state of the cushioning member is released, and the frame member deforms in a direction to reduce the tension of the tension structure.

The present invention provides the seat structure according to above, wherein upon receipt of an impact vibration or an impact force at a predetermined magnitude or more, a side frame portion constituting the back frame member deforms to fall inward to reduce the tension of the tension structure.

The present invention provides the seat structure according to above, wherein the back frame member is provided with a bending action portion which bends rearward when receiving an impact vibration or an impact force at a predetermined magnitude or more.

The present invention provides the seat structure according to above, wherein the seat frame member has a lifting mechanism that lifts a front end side of the seat frame member when receiving an impact vibration or an impact force at a predetermined magnitude or more.

The present invention provides the seat structure according to above, wherein the back frame member for supporting the back cushioning member and the seat frame member for supporting the seat cushioning member are individually formed by welding or caulking, and wherein a back arm member and a seat arm member are attached to the back frame member and the seat frame member respectively by welding or caulking to connect both through a reclining adjuster.

The present invention provides the seat structure according to above, wherein the reclining adjuster is attached to both the back arm member and the seat arm member by welding or caulking.

The present invention provides the seat structure according to above, wherein a slide adjuster for moving the seat frame member back and forth along a rail member fixed on a support floor surface is attached to the seat frame member and/or the seat arm member by welding or caulking.

The present invention provides the seat structure according to above, wherein the back frame member is formed in a shape of a frame having a lower frame portion disposed to run between lower portions of the pair of side frame portions, and a space portion above the lower frame portion for permitting the back cushioning member to protrude further to the rear than the lower frame portion.

The present invention provides the seat structure according to above, wherein a spring mechanism for serving functions of complementing a stroke of the cushioning members during seating and relieving vibration, comprises a torsion bar and a movable portion connected to the torsion bar, and the movable portion is provided at any position within a range of the cushioning members corresponding to the range from the vicinity of the waist portion to the vicinity of the haunches.

The present invention provides the seat structure according to above, wherein the movable portion is disposed in a width direction under a rear portion of the seat cushioning member and forced downward by the torsion bar in a normal state, and pulls downward the seat cushioning member by the torsion bar when the tension of the back cushioning member lowers due to receipt of an impact vibration or an impact force at a predetermined magnitude or more.

The present invention provides the seat structure according to above, wherein the movable portion is disposed in a width direction behind a lower portion of the seat cushioning member and forced rearward by the torsion bar in a normal state, and pulls rearward the seat cushioning member by the torsion bar when the tension of the back cushioning member lowers due to receipt of an impact vibration or an impact force at a predetermined magnitude or more.

The present invention provides the seat structure according to above, wherein the cushioning member is formed of a three-dimensional net member formed by connecting together a pair of ground knitted fabrics disposed apart from each other using connecting fibers, or a structure with urethane comprising a two-dimensional fabric or a two-dimensional knitting and a urethane layer layered on the two-dimensional fabric or the two-dimensional knitting.

According to the invention, when a large impact load is applied due to an impact vibration or an impact force, the cushioning member is displaced in the direction to be pushed in. Since the cushioning member is provided as a tension structure with a tension field on the frame member, the frame member deforms in the direction to reduce the tension of the cushioning member, thereby reducing the tension of the cushioning member. This damps the impact, and the cushioning member becomes no more the tension structure to damp the impact. Then, the cushioning member keeps receiving the impact force to be displaced, so that a new tension field is generated in the cushioning member to absorb an impact energy, thereby making it possible to suppress rebound of the human body or the like.

According to the invention, when a large impact load is applied due to an impact vibration or an impact force to displace the cushioning member in the direction to push it in, the contraction state of the cushioning member provided as a tension structure in the state of contracting in a tangential direction is released. By releasing the contraction state, the tension field formed in a normal state is lost so that the tension lowers to an expansion rate of 0%. This can suppress rebound of the human body or the like in contact with the cushioning member. Then, the cushioning member keeps receiving the impact force to be displaced, the cushioning member expands to thereby be able to absorb impact energy efficiently.

According to the invention, when a large impact load is applied due to an impact vibration or an impact force, the operation of releasing the contraction state of the above-mentioned cushioning member and the deformation operation of the frame are performed together. This makes it possible to relieve the impact more efficiently.

According to the invention, the frame member has a structure to deform in a direction to get closer to each other, and thus can reduce the tension of the cushioning member efficiently.

According to the invention, when the cushioning member provided as a tension structure is formed of a three-dimensional net member, high damping characteristics possessed by the three-dimensional net member itself can be utilized in addition. Further, the cushioning member as a tension structure with a predetermined tension field similar to that of the three-dimensional net member can also be formed of a structure with urethane comprising a two-dimensional fabric or knitting with a urethane layer.

According to the invention, the frame member deforms accompanying the displacement of the cushioning member to perform the operation similar to that of the invention above, thus making it possible to suppress rebound of the human body seated in the seat structure.

According to the invention, the contraction state of the cushioning member in the tangential direction is released to perform the operation similar to that of the invention above, thus making it possible to suppress rebound of the human body seated in the seat structure.

According to the invention, the operation of releasing the contraction state of the cushioning member and the deformation operation of the frame perform the operation similar to that of the invention above, thereby making it possible to suppress rebound of the human body seated in the seat structure.

According to the invention, a side frame portion deforms to fall inward to be able to reduce the tension of the cushioning member efficiently.

According to the invention, since the back frame member bends rearward, the portion from the haunches to the waist of a human body becomes easy to rotate to slide forward, thereby making it possible to disperse an impact vibration or an impact force acting in the normal line direction of the cushioning member efficiently to be able to further suppress rebound of the human body.

According to the invention, since the front end side of the seat frame member is lifted, the portion from the haunches to the waist becomes easy to rotate to slide forward, thereby making it possible to efficiently disperse an impact vibration or an impact force acting in the normal line direction of the cushioning member to be able to further suppress rebound of the human body.

According to the invention, the back frame member and the seat frame member are formed using no bolt, and the back frame member and the seat cushioning member are connected to the arm members using no bolt. Therefore, by setting the section moduli of the frame members different, it becomes easy to set the bending action portion for deformation at a desired position such as, for example, in the vicinity of the waist of the side frame portion, so that the manner of the deformation of the back frame member for loosening the tension of the back cushioning member stabilizes to be able to further suppress rebound of the human body. In addition, a bolt fastening step and the like become unnecessary when assembling them, thus contributing to simplification of assembly steps, reduction in manufacturing cost, and reduction in weight.

According to the invention, the reclining adjuster or the slide adjuster is also attached using no bolt, thus further facilitating the setting of the portion easy to bend and the assembly work.

According to the invention, when a large impact load is applied to the back cushioning member, the lower frame portion disposed between the side frame portions prevents uneven deformation in the vicinity of the lower portion of the back frame member. Further, the back cushioning member protrudes rearward from the space portion above the lower frame portion in a manner to slide on the lower frame portion, thereby enabling damping characteristics by the back cushioning member to function stably.

According to the invention, the torsion bar and/or the movable portion connected to the torsion bar are/is disposed in the width direction at any position within a range of the cushioning members corresponding to the range from the vicinity of the waist to the vicinity of the haunches, that is, under the seat back portion or behind the seat cushion portion. Therefore, when a large impact vibration or impact force is applied, if the torsion bar for forcing the seat downward is provided, the tension of the cushioning member lowers to pull the seat cushioning member downward, so that the haunches sink to generate a rotation force for relatively raising the knees, thereby enabling suppression of forward rebound.

On the other hand, if the torsion bar for forcing the back cushioning member rearward is provided, when a large impact vibration or impact force is applied, the tension of the cushioning member lowers to pull the back cushioning member rearward, thereby enabling suppression of forward rebound.

Further, in either case, the restoring force of the torsion bar disposed in the width direction can suppress uneven deformation of the lower portion of the back frame member. This stabilizes the manner of deformation of the back frame member, so that damping characteristics of the back cushioning member can be utilized effectively to provide a high degree of effectiveness to suppress rebound of the human body.

According to the invention, when the cushioning member provided as a tension structure is formed of a three-dimensional net member, high damping characteristics possessed by the three-dimensional net member itself can be utilized in addition. Further, the cushioning member as a tension structure with a predetermined tension field similar to that of the three-dimensional net member can also be formed of a structure with urethane comprising a two-dimensional fabric or knitting with a urethane layer.

BRIEF DESCRIPTION OF THE DRAWINGS

FIG. 1 is a perspective view for explaining the basic configuration of a seat structure according to a first embodiment of the present invention;

FIG. 8A is a cross-sectional view taken along a line A—A in FIG. 5, FIG. 8B is a cross-sectional view taken along a line A—A in FIG. 6, and FIG. 8C is a cross-sectional view taken along a line A—A in FIG. 7;

FIG. 9A is a view showing a state thereof during normal use, FIG. 9B is a view showing a state thereof when receiving an intermediate impact, and FIG. 9C is a view showing a state thereof when receiving a large impact;

FIG. 12 is a perspective view of the seat structure for explaining an action of the lifting mechanism relating to the above example when receiving a large impact (60 km/h);

FIG. 17 is a view showing an example of the other ground knitted fabric;

FIGS. 18A to 18E are views showing various manners of arrangement of connecting fibers;

FIGS. 19A and 19B are diagrams showing results of a rear-end collision test conducted on the seat structure of the first embodiment in which the three-dimensional net members are put up on the frame members shown in FIG. 1, and FIG. 19A is a diagram showing an acceleration at a breast portion, and FIG. 19B is a diagram showing an acceleration at a waist portion; and FIGS. 20A to 20F are views showing appearances of the characteristic behavior of a seated dummy doll in the rear-end collision test with respect to time.

DETAILED DESCRIPTION OF THE PREFERRED EMBODIMENTS

Figure 2:
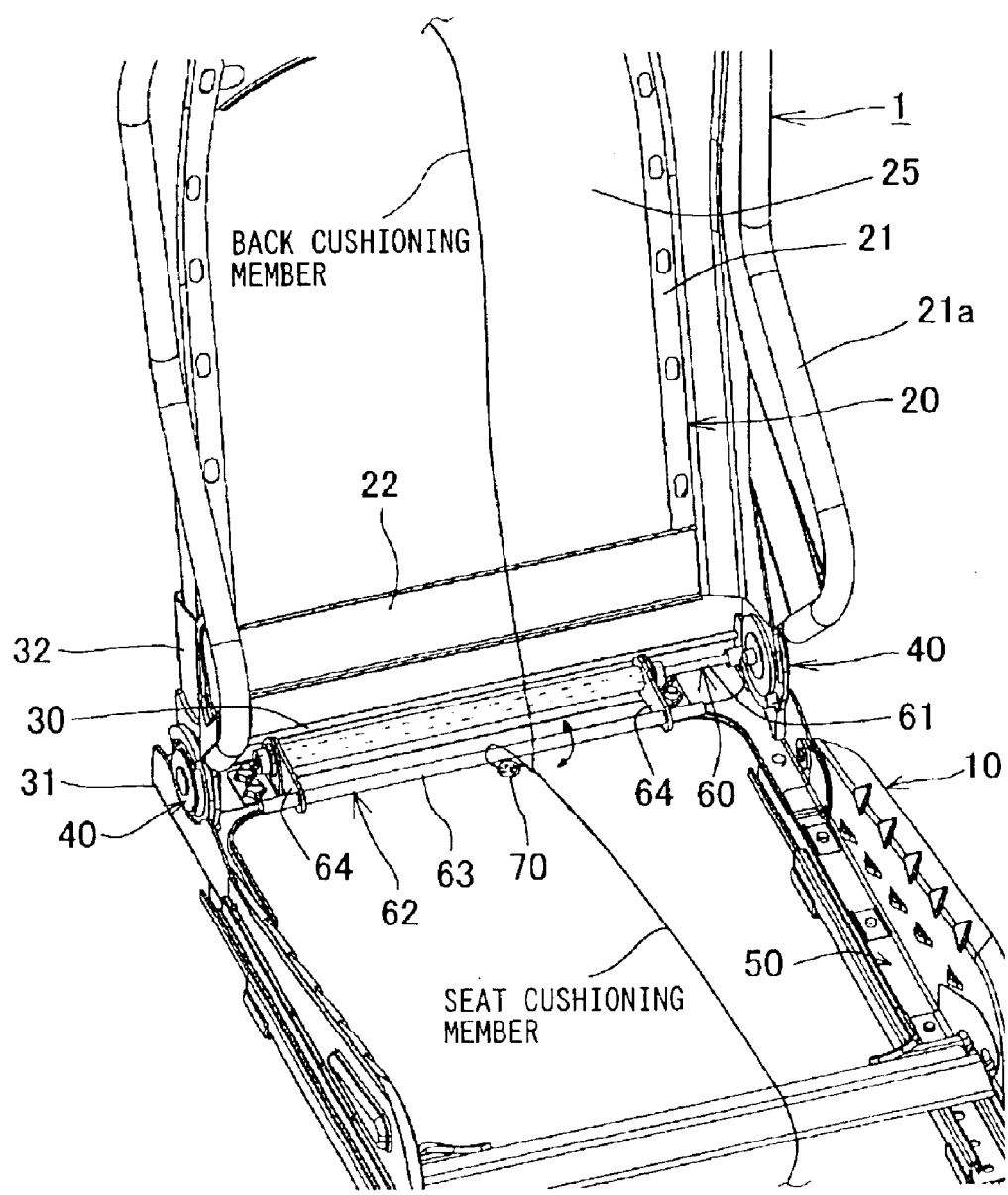
FIG. 2 is a view for explaining the essential portion of a seat structure according to a second embodiment of the present invention.

Hereinafter, the present invention will be described in more detail based on embodiments shown in the drawings.

First, referring to FIG. 15 to FIGS. 18A to 18E, the structure of a three-dimensional net member is explained which is used as a seat cushioning member put up and supported on a seat frame member 10 and a back cushioning member put up and supported on a back frame member 20 in a seat structure 1 according to embodiments of the present invention which will be described later.

Figure 15:
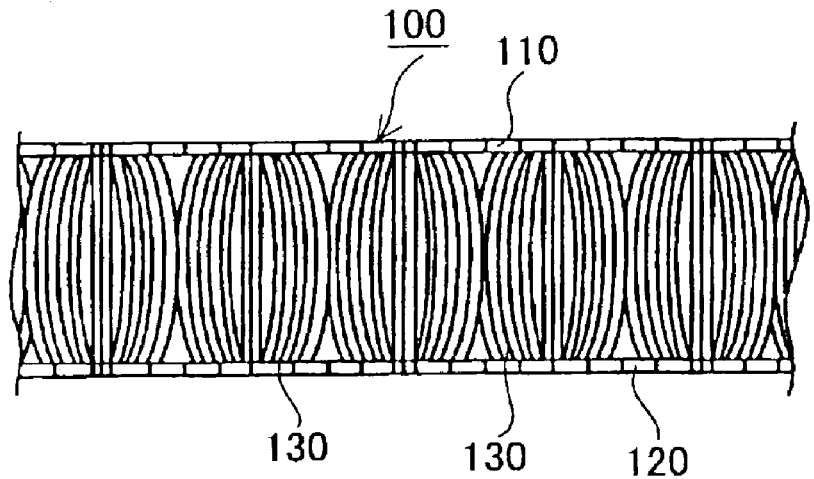
FIG. 15 is a cross-sectional view showing the configuration of an example of a three-dimensional net member usable in the above-described embodiments.

The three-dimensional net member is formed by connecting a pair of ground knitted fabrics disposed apart from each other using connecting fibers. Specifically, as shown in FIG. 15, a three-dimensional net member 100 is constituted of a solid, three-dimensional structure having a pair of ground knitted fabrics 110 and 120 disposed apart from each other and many connecting fibers 130 connecting between the pair of ground knitted fabrics 110 and 120.

Figure 16:
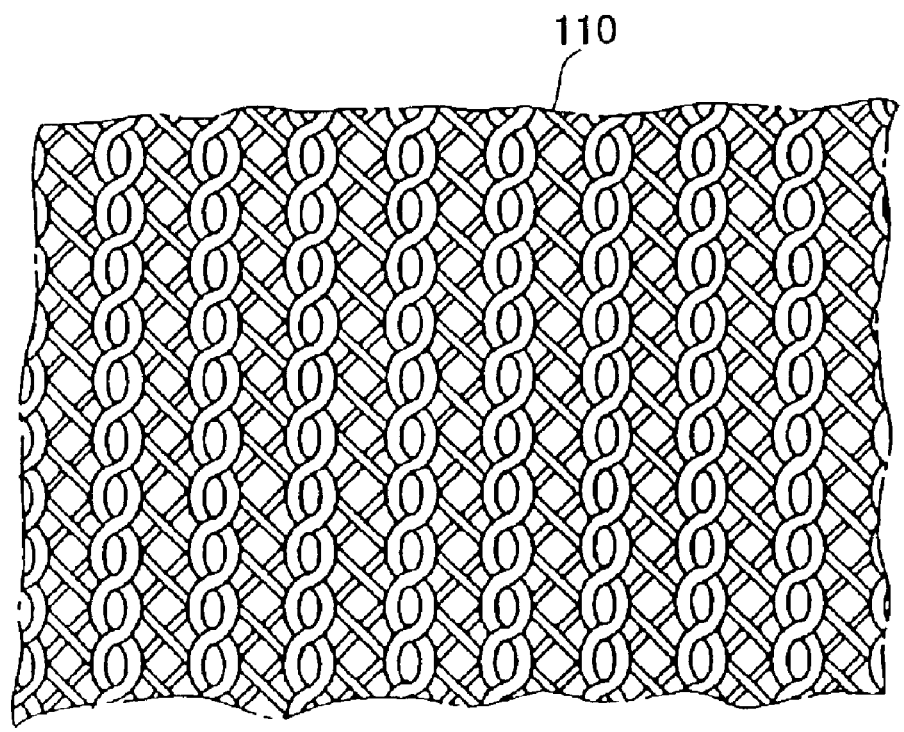
FIG. 16 is a view showing an example of one ground knitted fabric.

One ground knitted fabric 110 is formed in a flat knitted fabric structure (small mesh) continuing in both a wale direction and a course direction with yarns made of twisted monofilaments as shown, for example, in FIG. 16. On the other hand, the other ground knitted fabric 120 is formed in a structure of stitches larger than those of the one ground knitted fabric 110 and having a honey comb-like (hexagon) mesh with yarns made of twisted monofilaments as shown, for example, in FIG. 17. Needless to say, these knitted fabric structures are only examples, and it is also possible to adopt knitted fabric structures other than the small mesh structure and the honey come-like structure. The connecting fibers 130 are knitted between the pair of ground knitted fabrics 110 and 120 to keep a predetermined distance between the one ground knitted fabric 110 and the other ground knitted fabric 120, so that a predetermined stiffness is given to the three-dimensional net member 100 being a solid mesh knitting.

The selected ground fiber forming the ground knitted fabrics 110 and 120 has a thickness or the like in a range capable of providing a required firmness to a solid knitted fabric and giving rise to no difficulty in a knitting work. As the ground fiber, a monofilament can be used, but it is preferable to use a multifilament or a spun yarn from the point of view of feeling, softness in surface touch, and so on.

As the connecting fiber 130, it is preferable to use a monofilament, and one having a thickness in a range of 167 to 1100 decitex is suitable. This is because a multifilament cannot give a cushioning property having a favorable restoring force, a monofilament having a thickness smaller than 167 decitex hardly provides firmness, and a monofilament having a thickness exceeding 1100 decitex is too hard to provide a suitable elasticity. In other words, adoption of the monofilament within the aforementioned range as the connecting fiber 130 makes it possible to support the load of a seated person by deformation of stitches constituting the ground knitted fabrics 110 and 120 and deformation (falling down and buckling) of the connecting fibers 130, and by a restoring force of adjacent connecting fibers 130 giving spring characteristics to the deformed connecting fibers 130, thus providing a soft structure having soft spring characteristics without occurrence of stress concentration. In addition, the connecting fibers 130 rub together to cause high damping characteristics to function.

The material of the ground fiber or the connecting fiber 130 is not particularly limited, and usable materials are, for example, synthetic fibers or regenerated fibers such as polypropylene, polyester, polyamide, polyacrylonitrile, rayon, and so on, and natural fibers such as wool, silk, cotton, and so on. The abovementioned fibers may be used by itself and in any combination. It is preferable to use thermoplastic polyester fibers such as polyethylene terephthalate (PET) and polybutylene terephthalate (PBT), polyamide fibers such as nylon 6 and nylon 66, polyolefine fibers such as polyethylene and polypropylene, and a combination of two or more kinds of these fibers. Note that the polyester fibers are suitable because of their excellent recyclablility. Besides, the fiber shape of the ground fiber or the connecting fiber 130 is not limited, and a round cross-section fiber, a modified cross-section fiber, or the like can be used.

The arrangement manners of the connecting fibers 130 (pile structures), when expressing the states of the connecting fibers 130 connecting the ground knitted fabrics 110 and 120 seen from the side, are more specifically classified into, for example, the types shown in FIGS. 18A to 18E. FIGS. 18A and 18B show straight types in which the connecting fibers 130 are almost vertically knitted between the ground knitted fabrics 110 and 120, and out of them, FIG. 18A shows the one knitted almost straight in the shape of the FIG. 8, and FIG. 18B shows the one knitted simply straight. FIGS. 18C to 18E show cross types in which the connecting fibers 130 are knitted to cross each other on the way between the ground knitted fabrics 110 and 120, and out of them, FIG. 18C shows the one knitted in a cross in the shape of the letter 8, FIG. 18D shows the one knitted in a simple cross, and FIG. 18E shows the one knitted two yams together in a cross (double cross). It should be noted that the connecting fibers 130 when disposed slantwise in a cross with each other as shown in FIGS. 18C to 18E can give soft spring characteristics having a large compressibility while keeping a sufficient restoring force due to a buckling strength of the respective connecting fibers 130 as compared to the pattern in which the connecting fibers 130 are almost vertically disposed between the ground knitted fabrics 110 and 120 (see FIGS. 18A and 18B).

Next, referring to FIG. 1, the seat structure 1 according to a first embodiment of the present invention is explained. FIG. 1 shows the basic structure of the first embodiment. As shown in this drawing, the seat structure 1 comprises the seat frame member 10 for seat cushion, the back frame member 20 for seat back, seat arm members 31, back arm members 32, reclining adjusters 40, and slide adjusters 50.

The seat frame member 10 is designed to support the aforementioned three-dimensional net member for use as the seat cushioning member, and is formed in the shape of almost square frame of two side frame portions 11, a front frame portion 12, and a rear frame portion 13. Besides, the back frame member 20 is designed to support the aforementioned three-dimensional net member for use as the back cushioning member, and is formed in the shape of almost square frame of two side frame portions 21, a lower frame portion 22, and an upper frame portion 23. In addition, in this embodiment, these back frame member 20 and seat frame member 10 are individually formed by welding or caulking. Further, the side frame portions 21, 21 of the back frame member 20 are provided with shaping frame portions 21a, 21a for putting up the three-dimensional net member forming the back cushioning member in the shape for easily holding a human body. The shaping frame portions 21a, 21a are attached to the side frame portions also by welding or caulking. Note that, in this Description, the "side frame portions" which support or put up the back cushioning member thereon has the meaning of also including the shaping frame portions if provided.

Further, the seat arm members 31 are connected to a rear portion of the seat frame member 10, and the back arm members 32 are connected to a lower portion of the back frame member 20. The seat arm members 31 and the back arm members 32 are pivotably connected to each other through the reclining adjusters 40, thereby enabling the back frame member 20 to be reclined back and forth with respect to the seat frame member 10.

Further, in this embodiment, the seat frame members 10 and the seat arm members 31 are connected to each other by welding or caulking, and the back frame member 20 and the back arm members 32 are connected to each other also by welding or caulking. In addition, the reclining adjusters 40 are also attached to both the seat arm members 31 and the back arm members 32 by welding or caulking.

Further, in this embodiment, the slide adjusters 50 are provided which move back and forth the seat frame member 10 along a right-and-left pair of rail members 51 which are fixed on a support floor surface. The slide adjusters 50 are also attached to the seat frame member 10 by welding or caulking.

The three-dimensional net member is put up on the above-described frames constituting the seat frame member 10 and the back frame member 20, resulting in a tension structure with a tension field in a predetermined shape for use as the seat cushioning member and the back cushioning member. It should be noted that the three-dimensional net member provided as the tension structure as above is preferably put up on the seat frame member and the back frame member at an expansion rate of 30% or lower.

As described above, in this embodiment, the back frame member 20 and the seat frame member 10 are individually formed by welding or caulking, and the arm members 31 and 32 connecting the back frame member 20 and the seat frame member 10 are individually attached thereto by welding or caulking. Therefore, this embodiment provides a structure in which the back frame member 20 and the seat frame member 10 are formed using no bolt, and the back frame member 20 and the seat frame member 10 are connected to the arm members 31 and 32 using no bolt.

This eliminates a bolt fastening step and the like when assembling them. More than that, use of no bolt makes it possible that when a large impact load is applied on the back cushioning member, the back frame member 20 deforms in a more stable manner without deformation unevenly occurring at a bolt connecting portion, so that the tension of the back cushioning member, which is the tension structure with a tension field constituted of the three-dimensional net member, lowers to allow damping characteristics of the three-dimensional net member to function more reliably to be able to suppress rebound of a human body.

Further, the lower frame portion 22 is disposed as described above between lower portions of the pair of side frame portions 21, 21 forming the back frame member 20. As a result, when receiving a large impact load such as an impact vibration or an impact force at a predetermined magnitude or more, the back cushioning member constituting the tension structure deforms to be pushed out rearward to cause the side frame portions 21, 21 to fall inward, while it is possible to prevent only the lower portions of the side frame portions 21, 21 from unevenly deforming and to allow the damping characteristics owing to the lowering of the tension of the back cushioning member to function more reliably. Further, a space portion 25 surrounded by the upper frame portion 23 and the side frame portions 21, 21 is formed above the lower frame portion 22 to permit rearward protruding displacement or deformation of the back cushioning member when receiving the aforementioned large impact load.

In summary, according to this embodiment, when the application of a large impact in the back-and-forth direction causes the back of a seated person to relatively move rearward, an almost middle portion of the back cushioning member constituted of the three-dimensional net member is pushed to the rear of the seat back in a manner of sliding on the lower frame portion 22 by a large load at that time, followed by the back frame member 20 scattering and receiving the load inputted to the back cushioning member, and the side frame portions 21, 21 (and the shaping frame portions 21a, 21a) fall inward while uneven deformation is prevented by the lower frame portion 22 as described. As a result, a distance (space portion 25) between the oppositely disposed side frame portions 21, 21 (and the shaping frame portions 21a, 21a) is narrowed to loose at once the three-dimensional net member (back cushioning member) which is put up at a predetermined tension between the side frame portions 21, 21 (and the shaping frame portions 21a, 21a). When the tension of the three-dimensional net member (back cushioning member) is loosened, this three-dimensional net member (back cushioning member) becomes no longer the tension structure, and receives the impact generating new displacement. Therefore, the three-dimensional net member receives the impact force for a long time and thus can efficiently absorb its impact energy. In this event, the high damping characteristics possessed by the three-dimensional net member itself also function, thus forming a critical damping system at a damping ratio of 1 or more or an over damping system. This reduces rebound of the human body due to a reaction force.

Further, in this embodiment, the reclining adjusters 40 are individually attached to the arm members 31 and 32 by welding or caulking, and the slide adjusters 50 are attached to the seat frame member 10 by welding or caulking. In short, the reclining adjusters 40 or the slide adjusters 50 are also attached using bolt. This provides a structure capable of further facilitating the assembly work.

It should be noted that although the seat cushioning member (not shown) supported on the seat frame member 10 and the back cushioning member (not shown) supported on the back frame member 20 can be separately formed and individually attached, it is preferable to integrate separately formed cushioning members by sewing or use integrally knitted cushioning members. This facilitates the work of attaching the cushioning members to the frames 10 and 20. In addition, a pulling portion, which pulls rearward the vicinity of a boundary between the seat cushioning member and the back cushioning member, is provided and engaged with an auxiliary frame member 71 provided below the back frame member 20, thereby making it possible to enhance the stability of a portion from the vicinity of the waist portion to the vicinity of the haunches of a human body during seating. This point applies to later-described embodiments, but, in the later-described embodiments, the pulling portion of the cushioning members is connected to a movable portion of a torsion bar.

Besides, it is preferable to provide bending action portions for easiness of a rearward bend upon receipt of an impact vibration or an impact force at a predetermined magnitude or more on the side frame portions 21 (including the shaping frame portions 21a) constituting the back frame member 20. While the bending action portions may be set at arbitrary positions, for example, portions along an A line shown by an imaginary line in FIG. 1 can be made the bending action portions. While the bending action portions may be provided in an arbitrary manner, the bending action portions can be made to easily bend by setting their section modulus different from that of the other portion. In particular, in the case of a boltless structure as in this embodiment, deformation is suppressed unevenly from the portion corresponding to a bolt connecting portion, so that the bending action portions are easily set at desired positions such as in the vicinity of the waist. This causes a rotation force to act for the portion from the haunches to the waist to easily slide forward, thereby making it possible to further suppress rebound of the human body.

Besides, it is also applicable to make portions along imaginary lines B in FIG. 1 the bending action portions by setting their section modulus different from that of the other portion. In this case, since a front end side of the seat frame member 10 is moved up or lifted, the haunches sink, thereby causing a rotation force of relatively raising the knees to act to be able to enhance the effect of suppressing rebound of the human body. It is naturally possible to form the bending action portions along both the A line and the B lines shown in FIG. 1. Note that it is also possible to provide a lifting mechanism for allowing the front end side of the seat frame member to be easily moved up or lifted, and the lifting mechanism will be described later.

Next, referring to FIG. 2, a seat structure 1 according to a second embodiment of the present invention will be explained. FIG. 2 shows the basic structure of the second embodiment. As shown in this drawing, in the seat structure of this embodiment, a spring mechanism 60 is provided which serves functions of elastically supporting the above-described three-dimensional net member, complementing a stroke of cushioning members during seating, and relieving an excitation force being an input.

The spring mechanism 60 comprises a torsion bar 61 and a link portion 62, and the link portion 62 is composed of a movable portion 63 constituting of a rod member, and a pair of arm portions 64. The movable portion 63 connected to the torsion bar 61 is provided in the width direction of a seat frame member 10, and the torsion bar 61 connected to the movable portion 63 is disposed in the width direction and supported by arm members 31 which are positioned behind the movable portion 63 and connected to the seat frame member 10.

In addition, a rearward pulling portion 70, provided in the vicinity of a boundary between a seat cushioning member and a back cushioning member, is connected to the movable portion 63 to be given a spring property of the torsion bar 61.

It should be noted that, also in this embodiment, a back frame member 20 and the seat frame member 10 are individually formed by welding or caulking, the arm members 31 and 32 are attached to the back frame member 20 and the seat frame member 10 by welding or caulking, and reclining adjusters 40 are individually attached to the arm members 31 and 32 by welding or caulking. In addition, slide adjusters 50 are also attached to the seat frame member 10 by welding or caulking.

In this embodiment, the movable portion 63 connected to the torsion bar 61 can support the cushioning members constituted of the three-dimensional net members. As a result, it is only required to perform all the assembly work of the back frame member 20, the seat frame member 10, the torsion bar 61, and so on, and thereafter wrap them with the three-dimensional net members from the front side of the seat to cover these components and engage end portions of the three-dimensional net members to a predetermined frame portion, thus further facilitating the assembly work.

Further, the torsion bar 61 and the movable portion 63 connected thereto are disposed in the width direction of the seat cushion portion, so that when a large impact load is applied to the back cushioning member, its restoring force can suppress uneven deformation at the lower portion of the back frame member 20, resulting in deformation of the back frame member 20 in a more stable manner. In addition, the tension of the back cushioning member composed of the three-dimensional net member is loosened to allow the damping characteristics of the three-dimensional net member to function more reliably to be able to damp the impact for preventing a human body from being rebounded forward.

Furthermore, also in this embodiment, a boltless structure is provided to make it possible to facilitate the assembly work and enhance the function of suppressing rebound of a human body owing to the stable deformation of the back frame member 20 when receiving an impact load, caused by exhibition of high damping characteristics. In addition, since the bending action portions are easily arbitrarily set in this structure, the function of suppressing rebound of the human body can be enhanced as in the above-described first embodiment.

Moreover, in this embodiment, the movable portion 63 is provided to be forced downward by the torsion bar 61. Thereby, the rearward pulling portion 70 provided in the vicinity of the boundary between the seat cushioning member and the back cushioning member is forced to be pulled downward in the normal state. Therefore, the seat cushioning member and the back cushioning member are structured such that the spring property possessed by the back cushioning member itself whose top end position is fixed is balanced with the restoring force of the aforesaid torsion bar 61. Accordingly, the structure is designed such that an excitation force at a normal level is absorbed by the spring property possessed by the back cushioning member itself and the restoring force of the torsion bar 61.

On the other hand, when a large impact vibration or impact force at a predetermined magnitude or more is inputted, and side frame portions 21 (including shaping frame portions 21a) supporting the back cushioning member deform to fall inward as described above to reduce the tension of the back cushioning member, the pulling portion 70 is pulled in by the restoring force of the torsion bar 61, and along with this, the seat cushioning member is pulled downward. As a result, the vicinity of the haunches of the human body is pulled downward to generate a rotation force of relatively raising the knees, so that such an action can also suppress rebound of the human body.

Next, referring to FIG. 3, a seat structure 1 according to a third embodiment of the present invention will be explained. As in the second embodiment, a spring mechanism 80 is provided also in this embodiment. The spring mechanism 80 comprises a torsion bar 81 and a link portion 82, and the link portion 82 is composed of a movable portion 83 and a pair of arm portions 84 formed integrally with the movable portion 83. The movable portion 83 is provided in the width direction of a seat frame member 10.

In this embodiment, the movable portion 83 connected to the torsion bar 81 is disposed in the width direction under a rear portion of the seat cushioning member or at a position behind the boundary portion between the seat cushioning member and the back cushioning member. On the other hand, the arm portions 84 are made longer in length than those in the above-described embodiments so that the torsion bar 81 is supported by portions of the seat frame member 10 positioned under the vicinity of the front edge portion of the seat cushioning member. This is to enhance also the stiffness in the width direction in the vicinity of the front edge portion of the seat frame member 10 by the torsion bar 81, and the torsion bar 81 imparts the spring property to the movable portion 83 through the link portions 82.

It should be noted that, also in this embodiment, a back frame member 20 and the seat frame member 10 are individually formed by welding or caulking, arm members 31 and 32 are attached to the back frame member 20 and the seat frame member 10 by welding or caulking, and reclining adjusters 40 are individually attached to the arm members 31 and 32 by welding or caulking. In addition, slide adjusters 50 are also attached to the seat frame member 10 by welding or caulking.

Further, numerals 85 denote a pair of tension band receiving portions formed at the inside of both side portions of the seat frame member 10 in such a manner to individually bulge out downward to prevent an excessive lift of the seat surface of the seat cushioning member. With the tension band receiving portions 85, tension bands 86 connected to the seat cushioning member are engaged respectively.

Also in this embodiment, the movable portion 83 connected to the torsion bar 81 allows the seat cushioning member composed of the three-dimensional net member to be elastically supported, so that there is no need to use a coil spring, thus further facilitating the assembly work. Further, the movable portion 83 is disposed in the width direction behind the portion corresponding to the range from the waist to the haunches of the human body in the back cushioning member and the seat cushioning member, so that the restoring force of the torsion bar 81 and the movable portion 83 connected thereto allows the back frame member 20 to deform in a stable manner. This deformation reduces the tension of the back cushioning member composed of the three-dimensional net member, and its damping characteristics function to be able to suppress rebound of the human body. Furthermore, the movable portion 83 of the torsion bar 81 is positioned behind the seat cushion portion, thus making it possible to reduce a feeling of something foreign at the femora and the haunch side.

Moreover, as in the second embodiment, the movable portion 83 is provided to be forced downward by the torsion bar 81 to provide a structure in which the spring property possessed by the back cushioning member itself is balanced with the restoring force of the torsion bar 81. Accordingly, the structure is designed such that an excitation force at a normal level is absorbed by the spring property possessed by the back cushioning member itself and the restoring force of the torsion bar 81. On the other hand, when a large impact vibration or impact force at a predetermined magnitude or more is inputted, and the side frame portions 21 (including the shaping frame portions 21a) supporting the back cushioning member deform to fall inward to reduce the tension of the back cushioning member, the pulling portion is pulled in by the restoring force of the torsion bar 81, and along with this, the seat cushioning member is pulled downward. As a result, the vicinity of the haunches of the human body is pulled downward to generate a rotation force of relatively raising the knees, so that such an action can also suppress rebound of the human body.

Furthermore, also in this embodiment, a boltless structure is provided as in the second embodiment to make it possible to facilitate the assembly work and enhance the function of suppressing rebound of a human body owing to the stable deformation of the back frame member when receiving an impact load. In addition, the bending action portions are also arbitrarily set to be able to further enhance the function of suppressing rebound of the human body as in the above-described embodiments.

Figure 4:
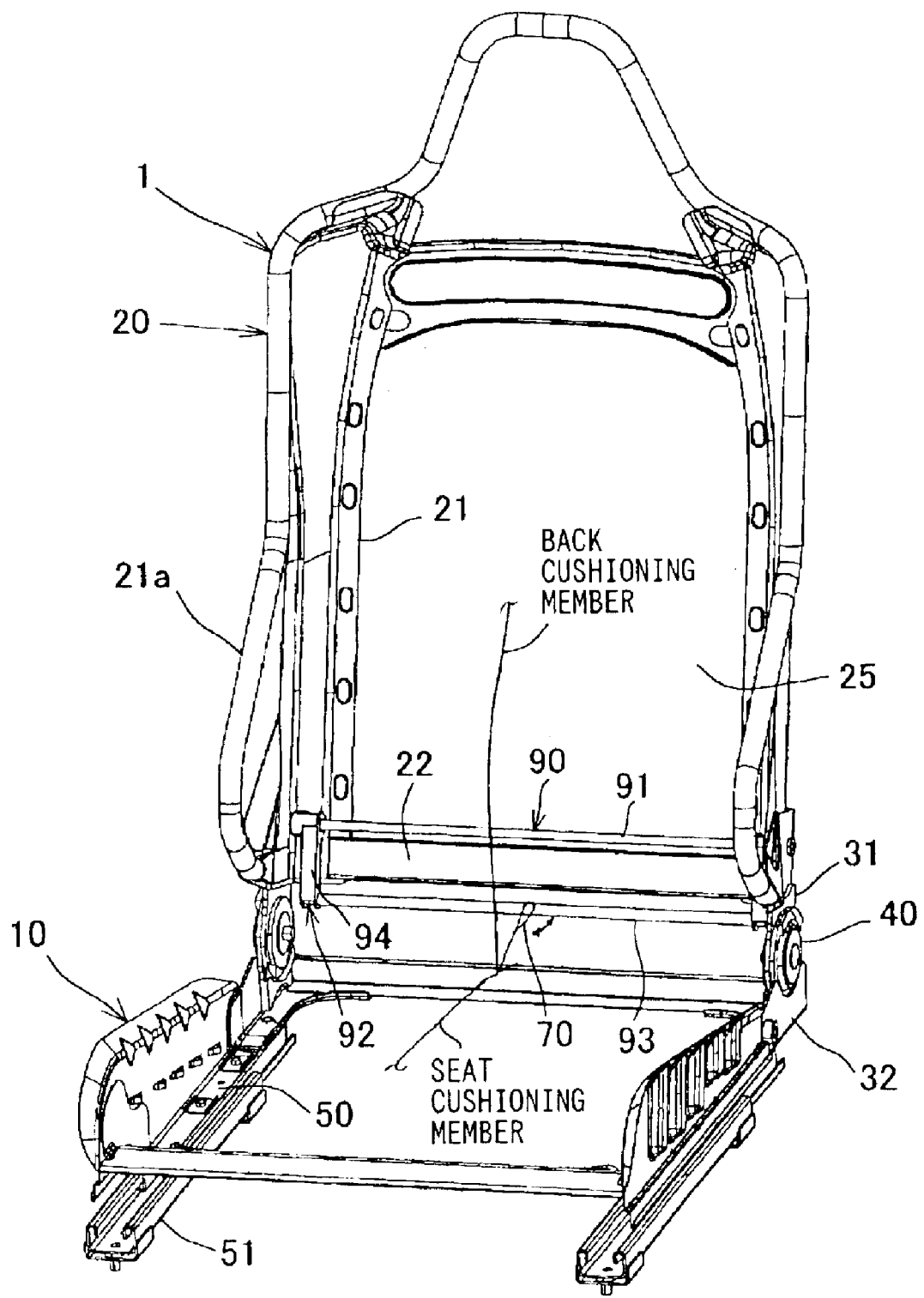
FIG. 4 is a view for explaining the essential portion of a seat structure according to a fourth embodiment of the present invention.

FIG. 4 is a view showing a fourth embodiment of the present invention. A back frame member 20 and a seat frame member 10 are individually formed by welding or caulking, arm members 31 and 32 are attached to the back frame member 20 and the seat frame member 10 by welding or caulking, and reclining adjusters 40 are individually attached to the arm members 31 and 32 by welding or caulking as in the above-described embodiments. In addition, slide adjusters 50 are also attached to the seat frame member 10 by welding or caulking as in the above-described embodiments.

In this embodiment, the position of arrangement of a spring mechanism 90 is different from that of the second and third embodiments. This spring mechanism 90 comprises a torsion bar 91 and a link portion 92 connected to the torsion bar 91, and further the link portion 92 is composed of a pair of arm portions 94 and a movable portion 93 disposed between the pair of arm portions 94. The movable portion 93 composed of a rod member is disposed behind a lower portion of the back cushioning member within a range from the vicinity of the waist to the vicinity of the haunches of the human body.

Besides, the torsion bar 91 imparting a spring property to the movable portion 93 is disposed in the width direction in the vicinity of the lower portion of the back frame member 20 and slightly above the movable portion 93. Further, a rearward pulling portion 70 in the vicinity of the boundary between the back cushioning member and the seat cushioning member is connected to the movable portion 93.

As a result of the pulling portion 70 being connected to the movable portion 93, a portion from the vicinity of the waist to the vicinity of the haunches of the human body of the back cushioning member and the seat cushioning member can be elastically supported, so that there is no need to dispose a coil spring, thus facilitating the assembly work.

However, according to this embodiment, the torsion bar 91 and the movable portion 93 are positioned in the vicinity of the lower portion of the back frame member 20 to increase the stiffness in the width direction of the back frame member 20 in the vicinity of the lower portion thereof, thus enhancing the function of preventing uneven deformation in the vicinity of the lower portion of the back frame member when receiving a large impact. As a result, the back frame member 20 deforms in a more stable manner in a direction to loose the tension of the back cushioning member to be able to further enhance the function of suppressing rebound of the human body by virtue of the damping characteristics of the back cushioning member.

Further, in this embodiment, the movable portion 93 is positioned below the position of arrangement of the torsion bar 91, so that the torsion bar 91 forces the movable portion 93 rearward, that is, in a direction in which the pulling portion 70 is pulled rearward. Therefore, when a large impact vibration or impact force at a predetermined magnitude or more is applied to reduce the tension of the back cushioning member, the back cushioning member is quickly pulled rearward through the pulling portion 70. This results in a very small force of rebounding the human body by the back cushioning member. Further, when the human body moves rearward to displace the back cushioning member more, the movable portion 93 rotationally moves rearward more to generate a new tension field by the restoring force of the torsion bar 91. In other words, the back cushioning member once loses the tension field and then regenerates a tension filed while damping the impact by virtue of the damping characteristics at that time, so that the back cushioning member can further convert the damped impact force into an elastic energy to absorb it, thus providing a function of scattering at a high level the impact exerted on the human body.

Figure 3:
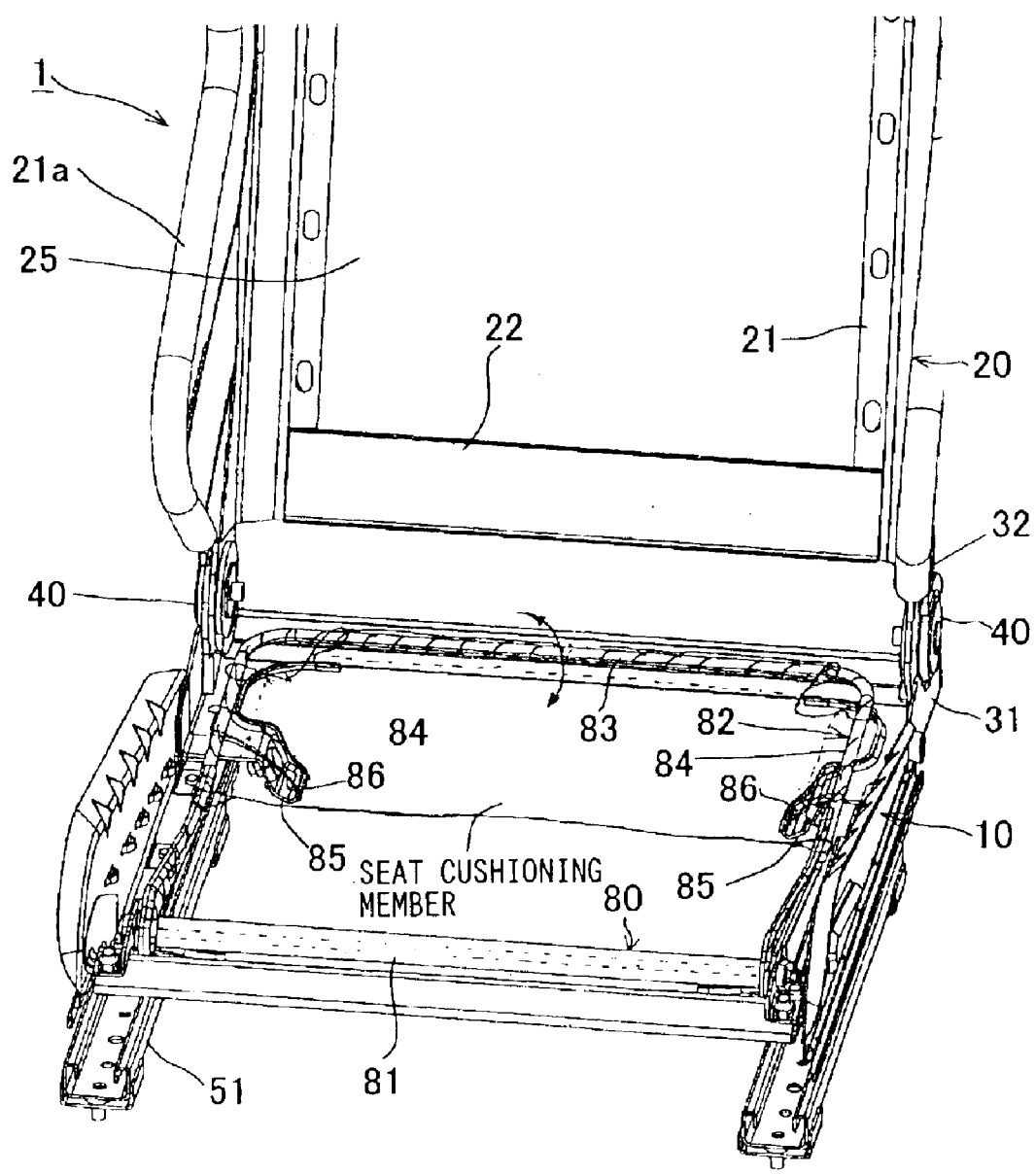
FIG. 3 is a view for explaining the essential portion of a seat structure according to a third embodiment of the present invention.

It should be noted that a lower frame portion 22 is disposed between lower portions of side frame portions 21, 21 of the back frame member 20 also in each of the above-described second, third, and fourth embodiments as shown in FIGS. 2 to FIGS. 4. Therefore, as in the first embodiment, the structure is designed such that when a large impact load is applied, the lower frame portion 22 can also prevent only lower portions of the side frame portions 21, 21 from unevenly deforming, thus allowing the damping characteristics to function more reliably due to the lowering of the tension of the back cushioning member.

The seat structure of the present invention is not limited to the above described embodiments. For example, the lower frame portion 22, which is provided to stabilize the manner for the back frame member 20 to deform when receiving an impact load, is not only combined with the aforementioned boltless structure or the structure provided with the torsion bar, but also applicable to a conventional bolt connecting structure. Even in this case, as compared to the case of the back frame member having a conventional structure with no lower frame portion, uneven deformation can be suppressed so that the damping property due to the lowering of the tension of the back cushioning member can be enhanced more than ever.

Furthermore, in the above-described embodiments, the three-dimensional net member is used for both the back cushioning member and the seat cushioning member. However, the cushioning member (the back cushioning member or the seat cushioning member) adopted in the seat structure of the present invention is only required to be a tension structure with a tension field by being put up on the frame member (the back frame member or the seat frame member) supporting the cushioning member, a structure capable of decreasing in tension and preferably forming a critical damping system or an over damping system when receiving a large impact load.

Therefore, it is also possible to use, in place of the three-dimensional net member used in the above-described embodiments, a two-dimensional structure with urethane comprising a two-dimensional fabric or a two-dimensional knitting; and a urethane layer having a surface layer layered on the two-dimensional fabric or the two-dimensional knitting. Note that a urethane layer can be used which is composed of a thin polyurethane foam about 2 to 30 mm in thickness.

When the present invention is constituted using such a two-dimensional structure with urethane, in spite of slightly inferior durability and permeability and a little bit high spring property, the two-dimensional structure with urethane can be used by being put up on the frame member, thus providing almost the same action and effects as those in the case using the above-described three-dimensional net member. Consequently, this two-dimensional structure with urethane is also useful, similarly to the three-dimensional net member, for various seat structures.

Further, the cushioning member composed of the three-dimensional net member, the two-dimensional structure with urethane, or the like is put up on the frame member at an expansion rate of 30% or lower as described above, and it is preferably put up at an expansion rate of lower than 0%, that is, in a contraction state with stitches of the three-dimensional net member or the like being reduced in size from those under no load. Besides, the portion to be brought to the contraction state may be the whole or a part of the cushioning member. For example, when the cushioning member is used as the seat structure, the above portion in the contraction state can be provided at a position of the seat cushioning member under the tuber ischiadicum and at a position of the back cushioning member corresponding to the vicinity of the lumbar vertebrae.

Means for providing the contraction state includes, for example, one for sewing and one for vibration welding the three-dimensional net member or the like with stitches thereof being reduced in size.

The tension structure having such a portion in the contraction state is provided, so that when a large impact vibration or impact force at a predetermined magnitude or more is applied thereto, the yarn sewing is cut or the welded portion peels off to release the contraction state to cause the stitches to expand. Since no restoring force acts from the contraction state to an expansion rate of 0% of the three-dimensional net member, the tension of the portion is lower than that within the range of normal use, so that high damping characteristics are exhibited. On the other hand, when the three-dimensional net member or the like has an expansion ratio exceeding 0% to begin expanding, the damped impact force is absorbed by an elastic energy of a newly created tension field. Therefore, high impact absorption characteristics can be exhibited.

It should be noted that the configuration in which the above-described portion in the contraction state is provided at least at a part of the cushioning member provided as the tension structure on the frame member, can be used by itself and in combination with the above-described impact absorbing structure utilizing the deformation of the frame member. In the case of using both of them, higher impact absorption characteristics can be exhibited with impact absorption characteristics owing to release of the contraction state of the cushioning member and impact absorption characteristics owing to deformation of the frame member.

Here, a specific example of the lifting mechanism that permits the front end side of the seat frame member 10 to move up or lift when receiving an impact vibration or an impact force at a predetermined magnitude or more, will be explained. First, an example of a lifting mechanism 200 is explained with reference to FIGS. 5 to FIGS. 8A to 8C. The lifting mechanism 200 comprises a lift controlling portion 210 which suppresses lift of the front end portion in the normal state and permits lift when an impact vibration or an impact force applies a load at a predetermined magnitude or more in the lift direction, and a lift restricting portion 220 which restricts lift at a magnitude greater than necessary.

Figure 8A:
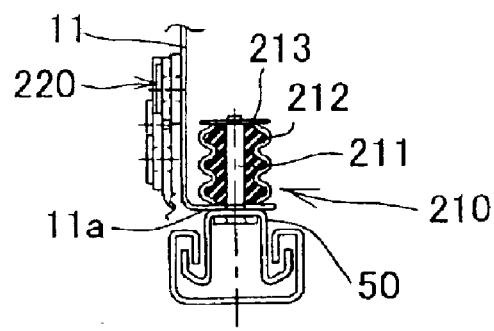
FIGS. 8A to 8C are views for explaining an action of the lifting mechanism.

The lift controlling portion 210 comprises, in a state of an inward projecting piece 11a in the vicinity of the front end of the side frame portion 11 being superposed on a forward portion of the slide adjuster 50 as shown in FIG. 8A, a fixing pin 211 provided from the slide adjuster 50 side in such a manner to piercing both the slide adjuster 50 and the inward projecting piece 11a; an elastic member 212 fitted around a shaft portion of a portion of the fixing pin 211 projecting from the inward projecting piece 11a; and a holding plate 213 which pushes the upper end of this elastic member 212 downward and is fixed in the vicinity of the upper end of the shaft portion of the fixing pin 211.

The lift restricting portion 220 is formed by connecting two link plates 222, whose one end is fixed to the slide adjuster 50 and the other end is fixed to a side face of the side frame portion 11, to each other through a shaft 221.

Figure 5:
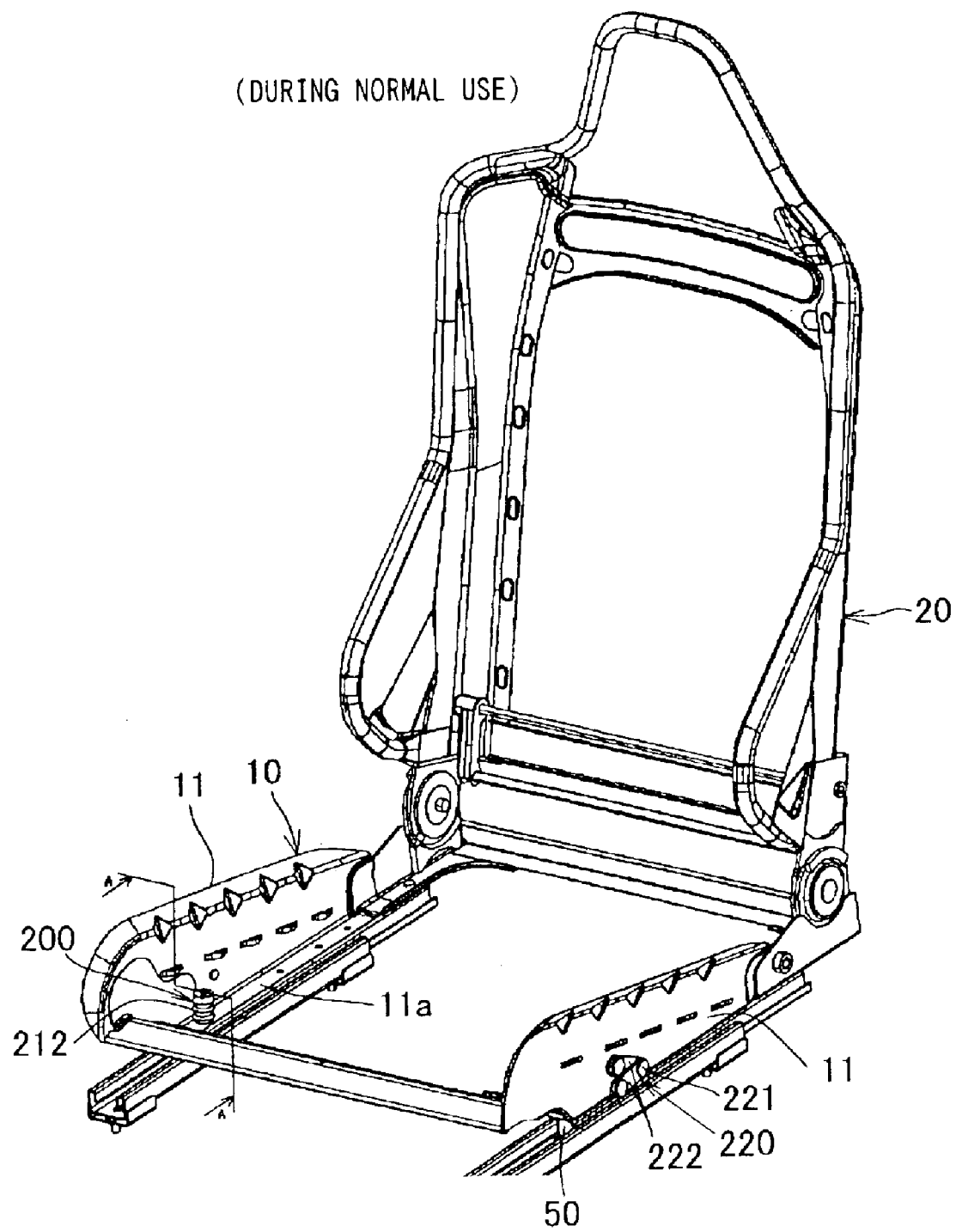
FIG. 5 is a perspective view of the seat structure for explaining an example of a lifting mechanism.
Figure 6:
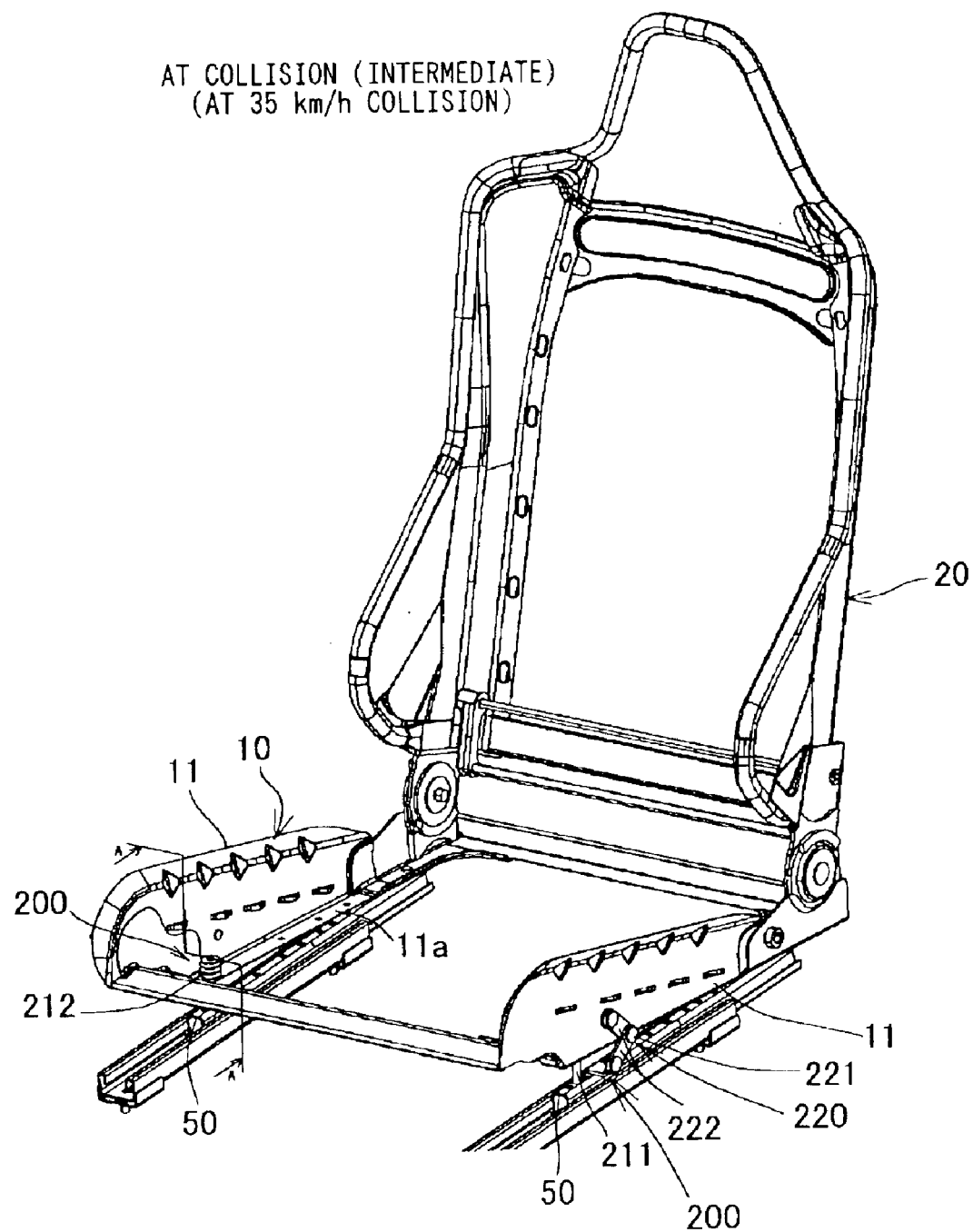
FIG. 6 is a perspective view of the seat structure for explaining an action of the lifting mechanism relating to the above example when receiving an intermediate impact (35 km/h)
Figure 7:
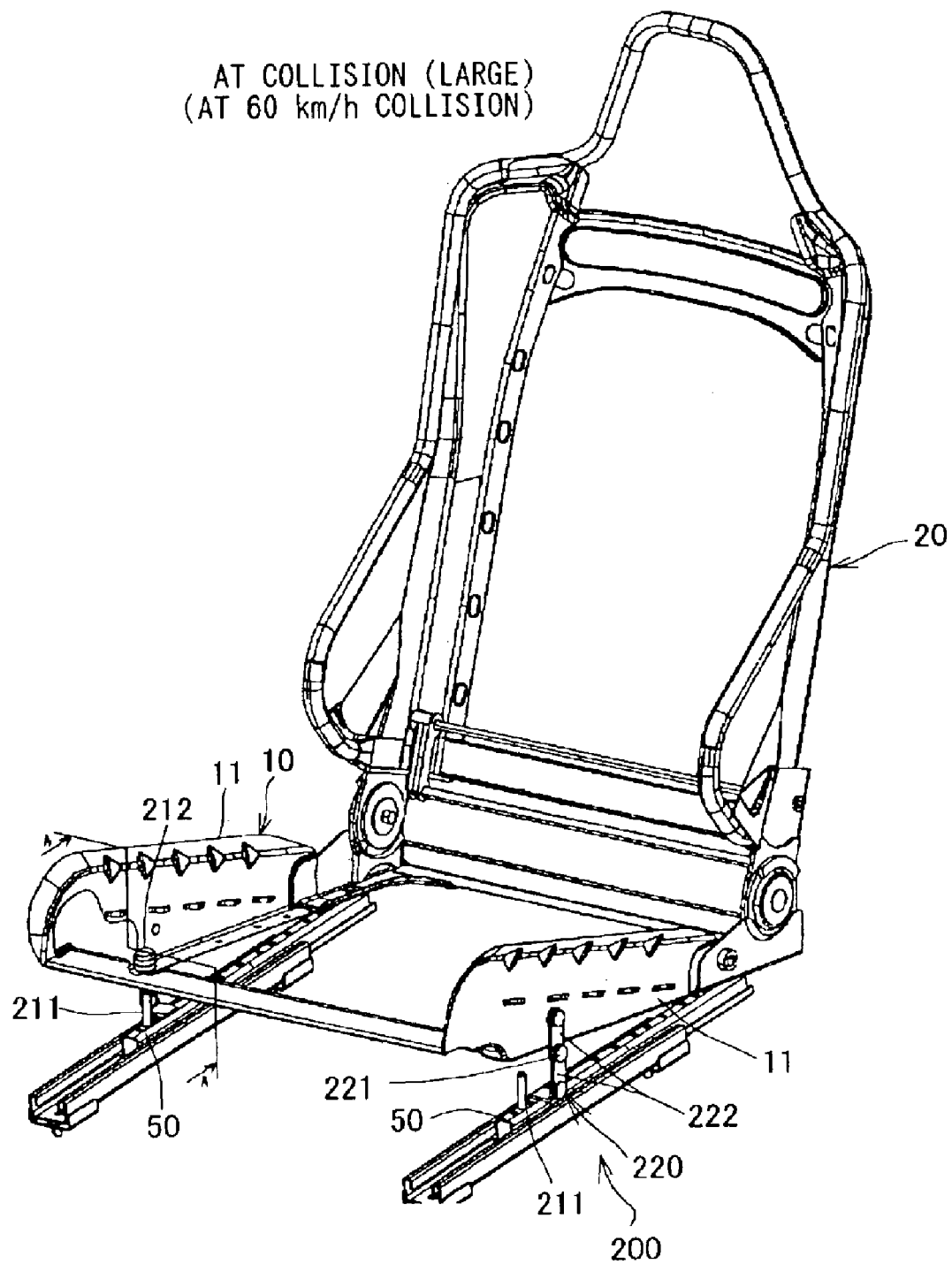
FIG. 7 is a perspective view of the seat structure for explaining an action of the lifting mechanism relating to the above example when receiving a large impact (60 km/h)
Figure 8B:
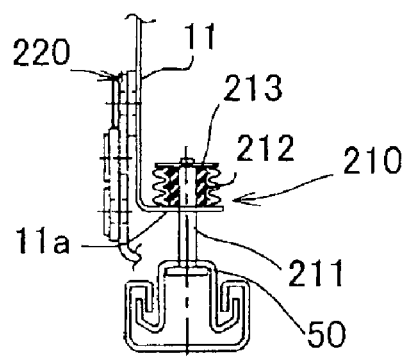
Figure 8C:
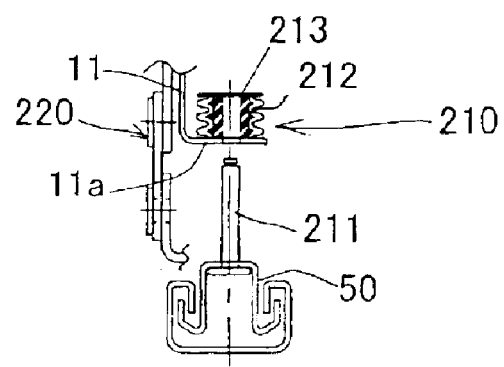

Accordingly, during normal use, the seat frame member 10 is used without the front end side of the side frame portion 11 separating upward, as shown in FIG. 5 and FIG. 8A, by means of the holding plate 213 and the elastic member 212, and without the link plates 222 spreading out. On the other hand, for example, when a rear-end collision applies a predetermined load in a direction to push the back cushioning member, the inward projecting piece 11a of the side frame portion 11 is lifted to move upward as shown in FIG. 6 and FIG. 8B. Thereby, the elastic member 212 is compressed and, at the same time, the two link plates 222 form a predetermined angle around the shaft 221 to spread out. Then, when a larger load is applied, the holding plate 213 gets unhinged from the shaft portion of the fixing pin 211 together with the elastic member 212 as shown in FIG. 7 and FIG. 8C, to permit lift.

As a result, when an impact vibration or an impact force applies a large load, the front end side of the seat frame member is lifted in accordance with the magnitude of the load. Thus, the haunches of the human body sink in response to the lift to relatively lift the knees, thus enabling suppression of rebound of the human body. Further, even if a large load is applied and the holding plate 213 gets off from the shaft portion of the fixing pin 211, the lift of the front end side of the seat frame member is restricted at a point when the link plates 222 fully extend into almost one straight line as shown in FIG. 7 and FIG. 8C. This restricts the rearward inclination angle of the seat back accompanying the above extension to be able to prevent the seat back from falling toward a seated person in the rear seat.

Note that the material of the elastic member 212 is not limited as long as serving the above-described function, and adoptable materials include rubber members, spring members, bellow members made of metallic material, members made by appropriately combining them, and the like.

Figure 9A:
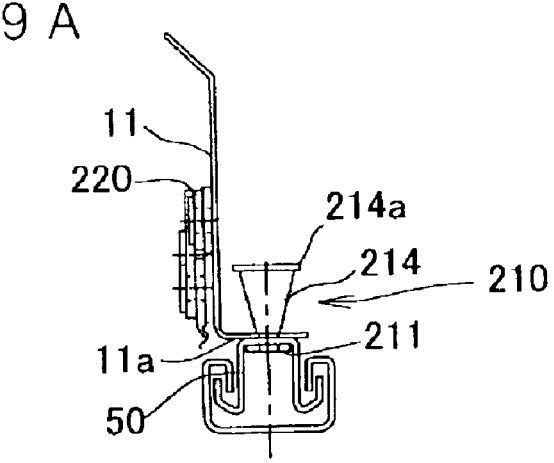
FIGS. 9A to 9C are views for explaining another example of the lifting mechanism.
Figure 9B:
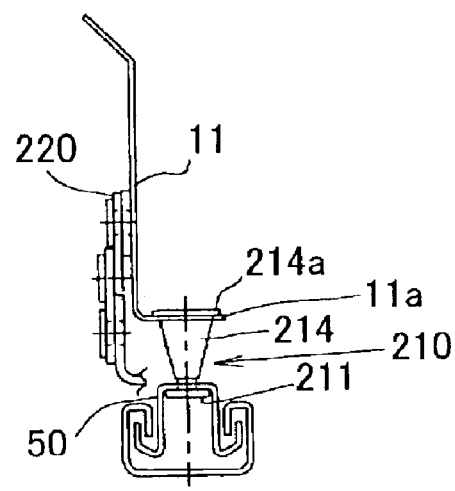
Figure 9C:
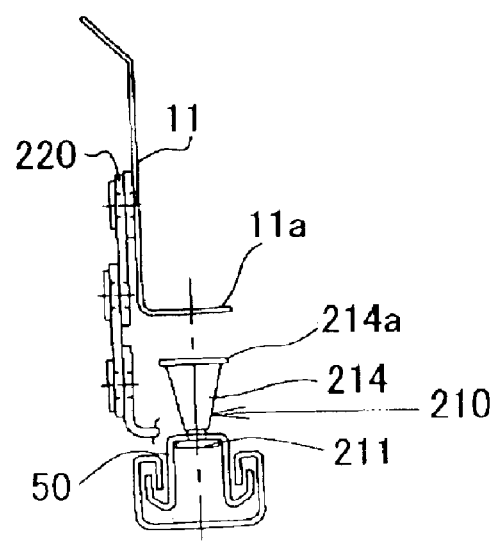

FIGS. 9A to 9C show another example of the lift controlling portion 210 structured such that, in place of the above-described elastic member 212 and holding plate 213, a tapered member 214 having a flange portion 214a at the upper end portion and decreasing in diameter downward is fixed around the shaft portion of the fixing pin 211.

During normal use, as shown in FIG. 9A, the inward projecting piece 11a of the side frame portion 11 is positioned in the vicinity of the lower end of the tapered member 214. On the other hand, when a predetermined load causing the front end side of the seat frame member 10 to separate upward is applied, an engagement hole of the inward projecting piece 11a is reamed so that the inward projecting piece 11a is lifted to a position to hit against the flange portion 214a as shown in FIG. 9B. When a larger load is applied, the engagement hole of the inward projecting piece 11a is reamed further so that the inward projecting 11a climbs over the flange portion 214a to get off therefrom as shown in FIG. 9C. This permits a lift motion of the seat frame member 10. Note that the lift restricting portion 220 with the link plates 222 restricts rearward inclination of the seat back greater than necessary as in the above-described example.

FIGS. 10A to 10C to FIG. 12 show still another example of the lifting mechanism 200. In this example, the lift controlling portion 210 is formed in the shape of the letter L in which one face thereof is welded to the slide adjuster 50 and the other face is disposed along the side face of the side frame portion 11, and comprises a plate member 215 formed with a vertically long slit 215a; and a fixing pin 216 inserted through the slit 215a and fixing the side frame portion 11. Further, the inside of the slit 215a is provided with a protruding portion 215b protruding inward. The lift restricting portion 220 comprises two link plates 222 provided through the shaft portion 221 as in the above-described examples.

Figure 10A:
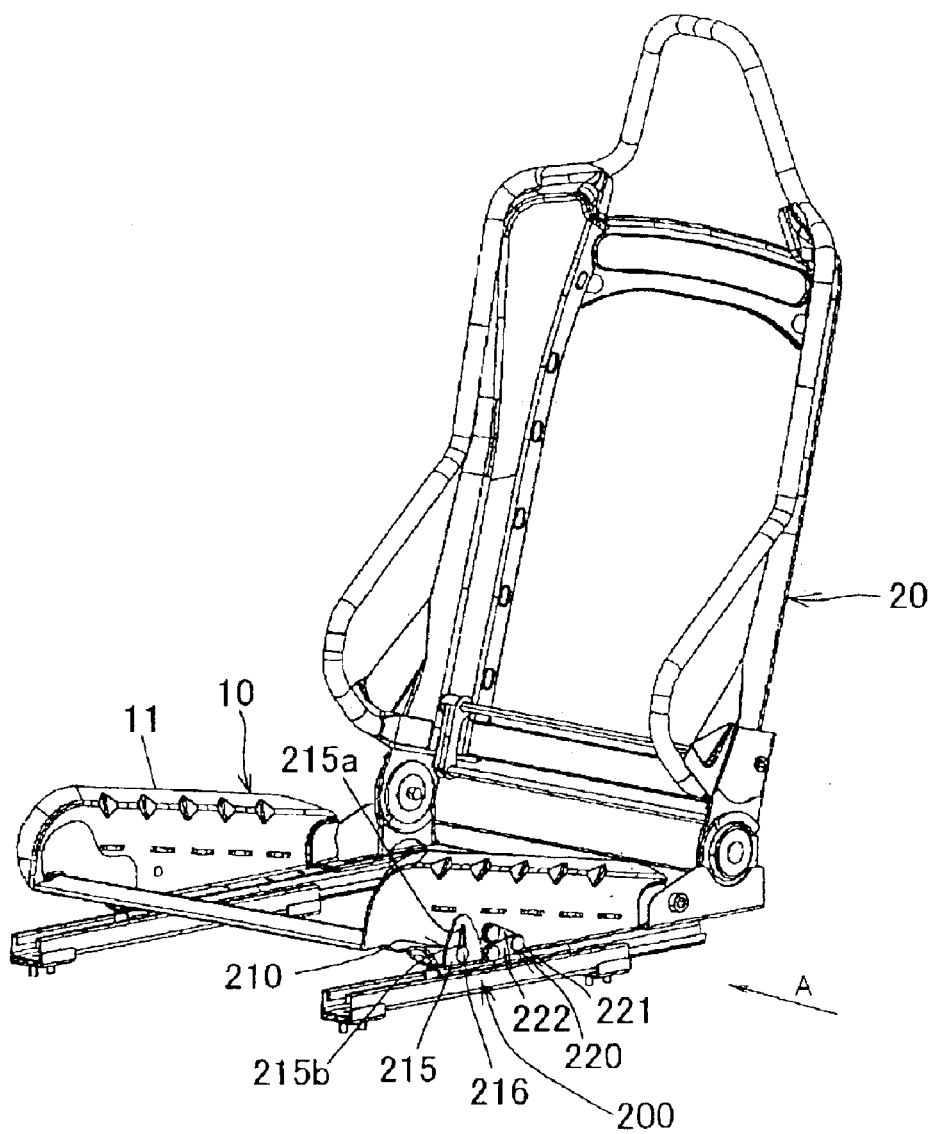
FIG. 10A is a perspective view of a seat structure for explaining still another example of the lifting mechanism.
Figure 10B:
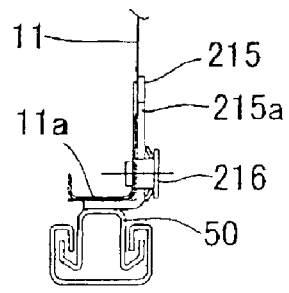
FIG. 10B is a cross-sectional view taken along a line B—B in FIG. 10C.
Figure 10C:
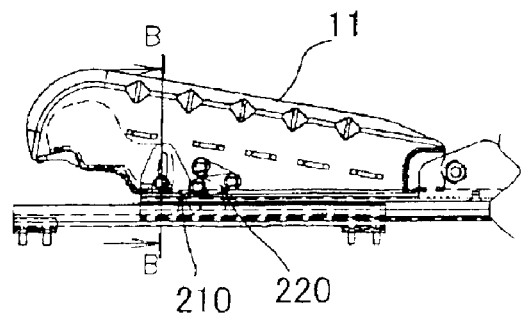
FIG. 10C is a view in a direction of an arrow A in FIG. 10A.
Figure 11:
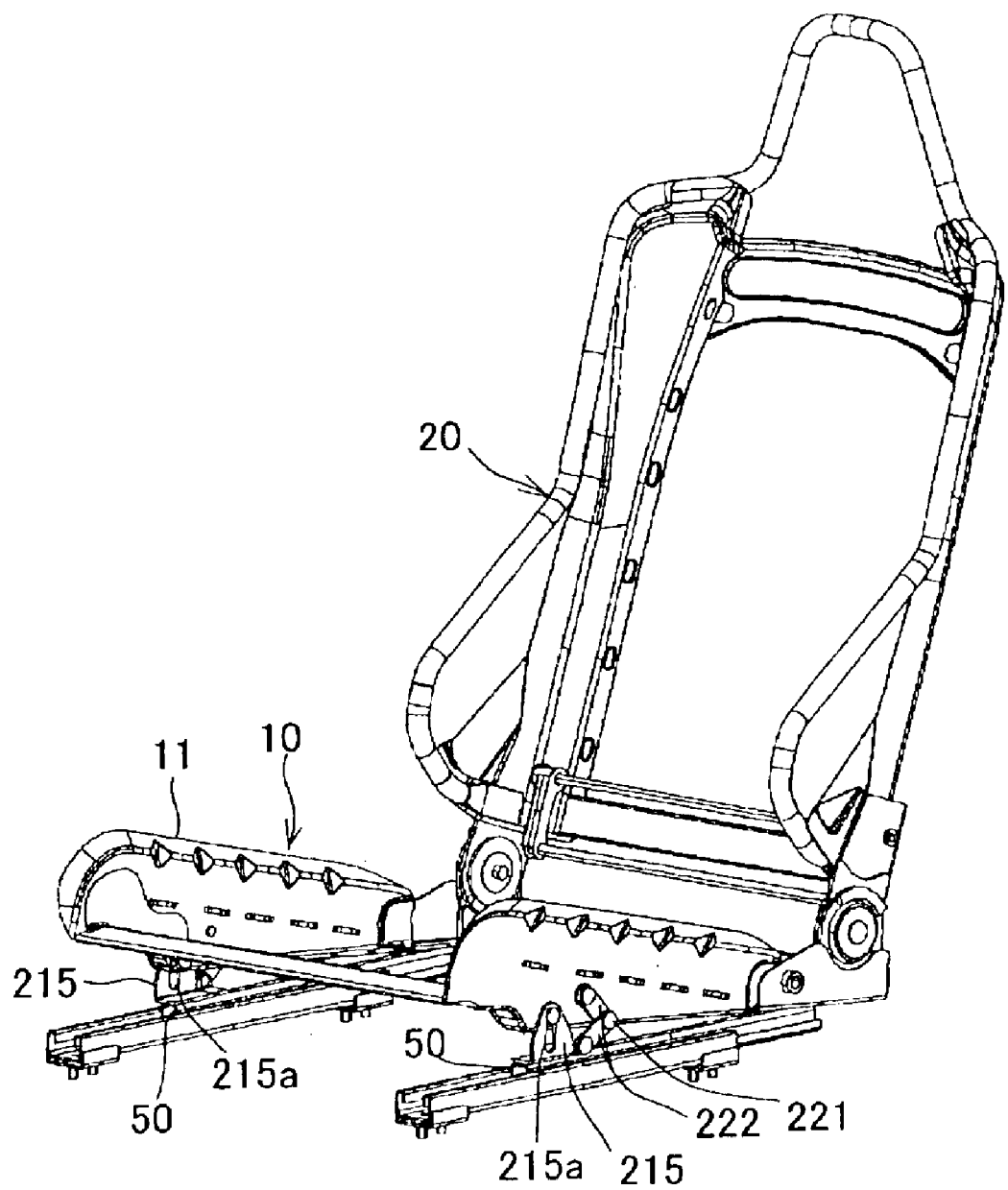
FIG. 11 is a perspective view of the seat structure for explaining an action of the lifting mechanism relating to the above example when receiving an intermediate impact (35 km/h)

In the above configuration, during normal use, the fixing pin 216 is restricted by the protruding portion 215b of the slit 215a to hold the seat frame member 10 at a predetermined position as shown in FIGS. 10A to 10C. In contrast to this, when a predetermined load causing the front end side to separate upward is applied, the fixing pin 216 is guided to move upward inside the slit 215a in such a manner to crush the protruding portion 215b as shown in FIG. 11. Then, at a point where the fixing pin 216 hits against the upper edge of the slit 215a, its travel distance is restricted. When a larger load is applied, the fixing pin 216 hit against the upper edge of the slit 215a is broken to lift further the front end side of the side frame portion 11 as shown in FIG. 12, thereby reducing the magnitude of rebound of the human body. The rearward inclination angle of the seat back at this time is restricted by the lift restricting portion 220 as in the above-described examples.

Figure 13A:
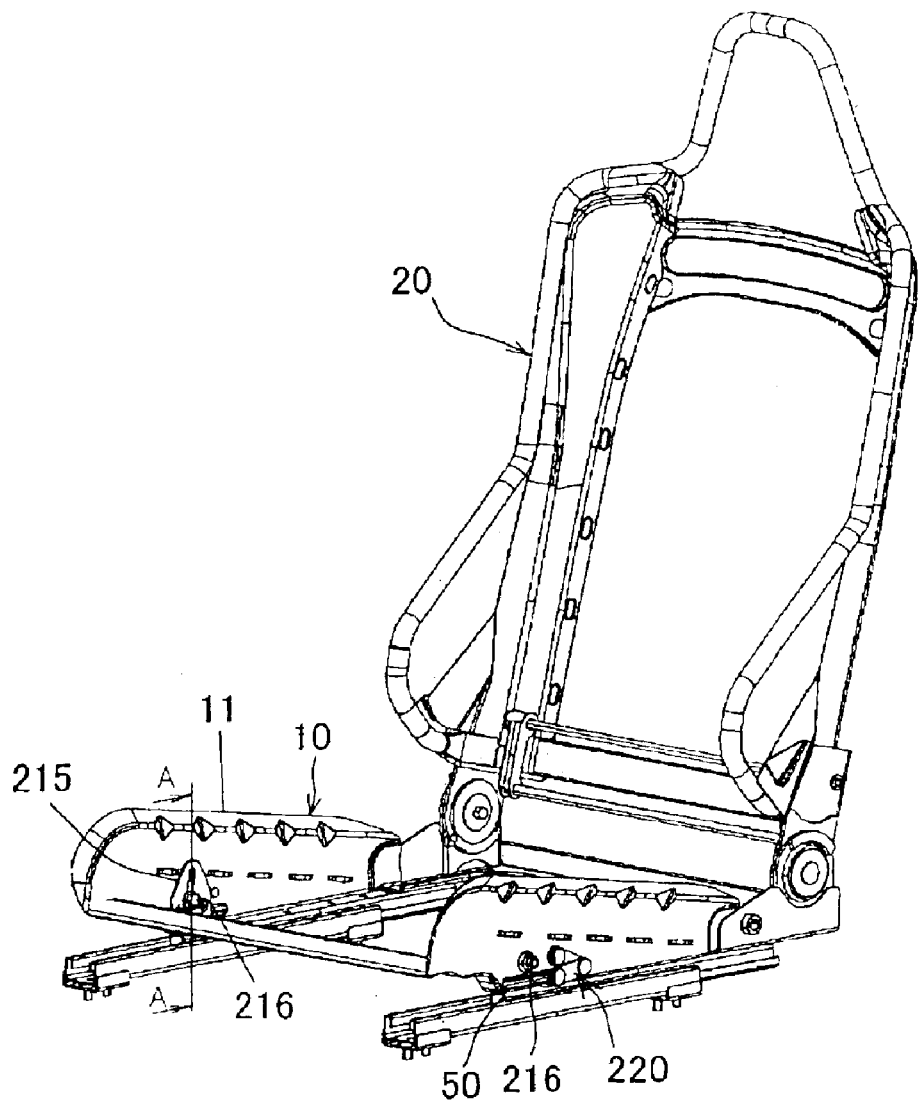
FIG. 13A is a perspective view of a seat structure for explaining yet another example of the lifting mechanism.
Figure 13B:
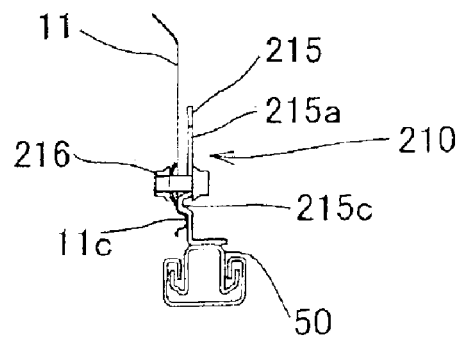
FIG. 13B is a cross-sectional view taken along a line A—A in FIG. 13A.
Figure 14A:
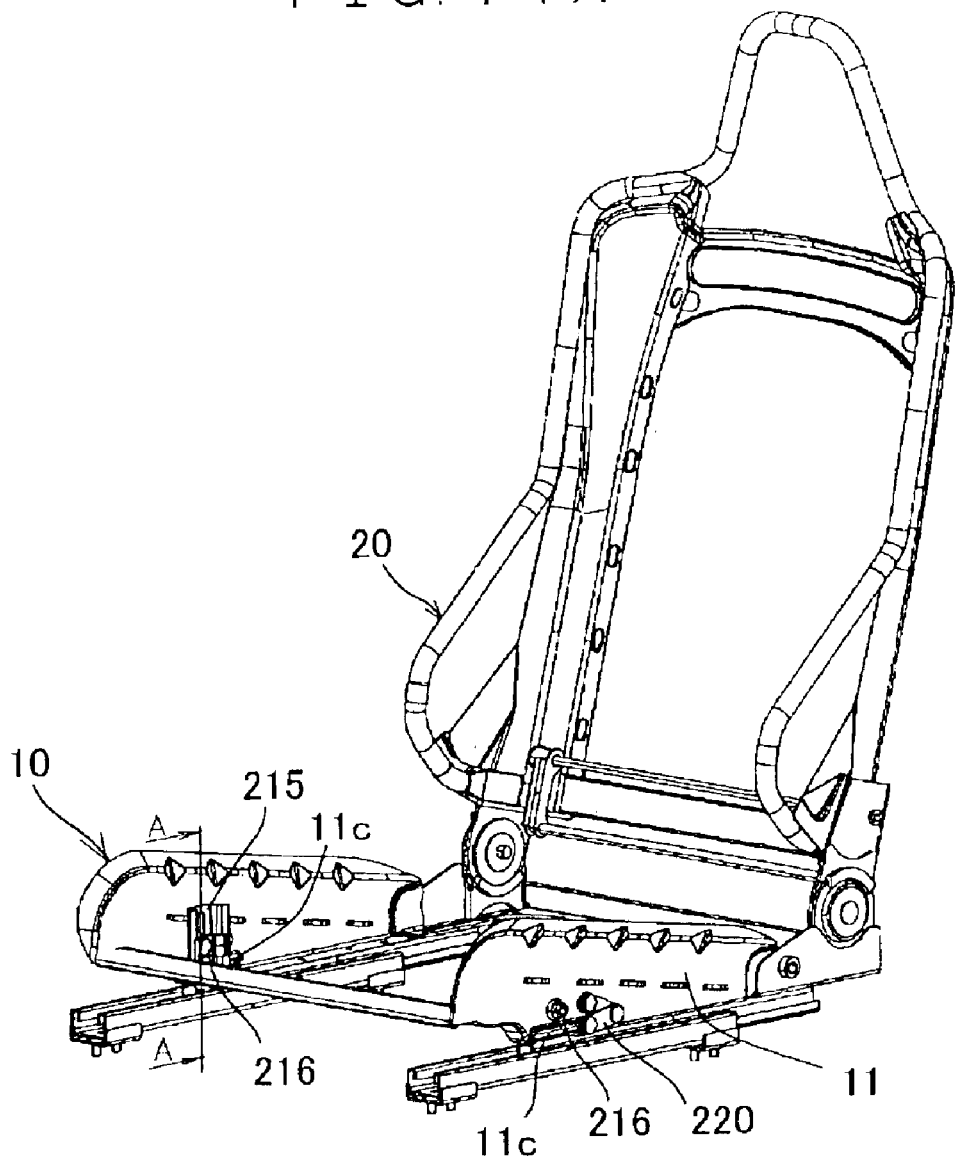
FIG. 14A is a perspective view of a seat structure for explaining further another example of the lifting mechanism.
Figure 14B:
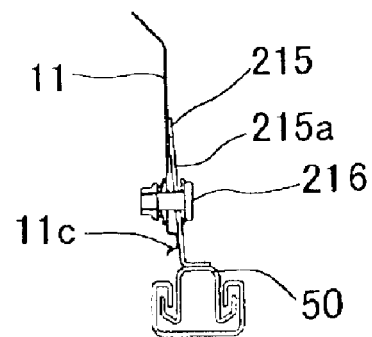
FIG. 14B is a cross-sectional view taken along a line A—A in FIG. 14A.

In this example, the protruding portion 215b is caused to protrude in the slit 215a to thereby restrict the attachment position of the fixing pin 216 during normal use. However, it is possible to adopt, as means for restricting the attachment position of the fixing pin 216, means for providing protruding ridge portions 11c and 215c which can engage with each other in a staggered manner, at both the side plate portion 11 and the plate member 215 in the shape of the letter L as shown in FIGS. 13A and 13B. Further, it is also possible to provide the protruding ridge portion 11c only in the vicinity of the lower portion of the side frame portion 11 and dispose slantwise the plate member 215 in the shape of the letter L such that the higher the plate member 215 goes, the closer to the side face of the side frame portion 11 the plate member 215 becomes as shown in FIGS. 14A and 14B, thereby making it possible to restrict the load required when the side frame portion 11 is lifted.

It should be noted that the above-described lifting mechanisms 200 are only examples, and it is of course to use any mechanism as long as it can permit lift of the front end side of the seat frame member 10 and restrict a rearward inclination greater than necessary due to the lift when a predetermined load is applied.

In the foregoing, the explanation is made taking as an example the case where the impact absorbing structure of the present invention is applied to the seat structure. However, the impact absorbing structure of the present invention is not limited to the seat structure, but can be adopted in place of a cushioning material (mat) or the like utilizing internal damping typified by viscoelastic urethane and gel used when the human body is transported at a predetermined acceleration such as at a time of emergency escape or at a time of a fall from a height.

(Test Example)

For the seat structure made by putting up the three-dimensional net member on the frame member according to the first embodiment shown in FIG. 1, a rear-end collision test was carried out with a dummy doll 100 kg in weight seated wearing a seat belt. It should be noted that the test was carried out by colliding a flat car against, from behind, a vehicle frame with the seat structure mounted thereon at a maximum acceleration of 171.1 m/s$^2$ and a final speed of 7.1 m/s and measuring accelerations of the breast portion and the waist portion of the dummy doll.

The result is shown in FIGS. 19A and 19B. FIG. 19A shows the acceleration of the breast portion, and FIG. 19B shows the acceleration of the waist portion respectively. Note that in the drawings, figure X indicates the acceleration in the right-and-left direction (BL direction), figure Y indicates the acceleration in the back-and-forth direction (TL direction), and figure Z indicates the vertical direction (WL direction). Further, changes in behavior of the dummy doll were photographed in succession during the test, and the appearances of the behavior with respect to time are shown in FIGS. 20A to 20F.

First, as clear from FIG. 19A, the breast portion is pushed rearward to the point in time of about 50 msec after the collision, and thereafter pushed rearward due to the deformation of the back frame member, showing the maximum acceleration from about 70 msec to about 80 msec, and the acceleration settling until about 110 msec. These phenomena occur because the three-dimensional net member being the tension structure is pulled toward its center to cause the deformation of the back frame member, thereby reducing the tension of the three-dimensional net member at once. In this event, the head portion of the dummy doll showed no large rebound in the back-and-forth direction during this period (see FIGS. 20A and 20B). Subsequently, the dummy doll showed the behavior such that the acceleration slightly increased due the deformation of the frame at about 110 msec, then the deformation of the frame continuing until about 150 msec, and thereafter the acceleration slightly increased again.

The acceleration increases at about 150 msec, but a moment generated in a rotational direction due the movement of the trunk cancels a force of the head portion moving forward generated by a reaction force of the back cushioning member, and thus the increase in acceleration is in the sate in which the head portion is fixed to the seat, resulting in a small amount of movement in the back-and-forth direction of the head portion (see FIGS. 20C and 20D). Therefore, the increase in acceleration is considered to be caused by the restoring force of the frame member.

Further, as clear from FIG. 19A, from 50 msec to 60 msec when the breast portion is pushed against the back cushioning member at first, the vertical acceleration does not exceeds in value the horizontal acceleration, which shows a small magnitude of rebound of the dummy doll.

Furthermore, as shown in FIG. 19B, the acceleration of the waist portion in the vertical direction increases and then quickly settles with little change in acceleration, which shows a small magnitude of rebound of the waist portion.

Furthermore, referring to FIGS. 20A to 20F, it is found that changes in behavior from 0 msec to 180 msec are as described above. Moreover, in comparison FIG. 20D at 180 msec to FIG. 20E at 240 msec, there is a small difference in position of the head, which shows a small magnitude of rebound thereof. This is because the trunk is pushed against the back cushioning member to thereby suppress forward rebound of the head portion. Similarly, it is shown that there is a little difference between the position of the head portion in FIG. 20E at 240 msec and the position of the head portion in FIG. 20F at 280 msec.

From the foregoing, it is found that, in the net seat of Test Example, the three-dimensional net member being a tension structure reduces in tension when receiving a large impact vibration or impact force, thereby providing high damping characteristics. More specifically, as the evaluation of impact absorption characteristics, a small relative displacement in the back-and-forth direction of the head portion and the trunk and a small acceleration in the vertical direction are preferable, and the present invention includes a structure capable of providing characteristics very close to such preferable characteristics.

The impact absorbing structure and the seat structure to which the impact absorbing structure is applied of the present invention can exhibit high damping characteristics because they are structured such that the tension of the cushioning member provided as a tension structure lowers when receiving an impact vibration or an impact force at a predetermined magnitude or more.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A seat structure, comprising:
   a back frame member;
   a seat frame member; and
   a cushioning member provided as a tension structure with a tension field formed by being supported on each of said frame members,
   wherein each side frame portion constituting said back frame member is respectively provided with a shaping frame portion protruding forward from said side frame portion, and said cushioning member supported on said back frame is put up between the shaping frame portions; and
   wherein upon receipt of an impact vibration or an impact force at a predetermined magnitude or more, said shaping frame portions protruding forward from said side frame portion deform to fall toward each other to reduce the tension of said cushioning member supported on said back frame.

2. The seat structure according to claim 1,
   wherein said back frame member is provided with a bending action portion that bends rearward when receiving an impact vibration or an impact force at a predetermined magnitude or more.

3. The seat structure according to claim 1,
   wherein said back frame member for supporting said back cushioning member and said seat frame member for supporting said seat cushioning member are individually formed by welding or caulking, and
   wherein a back arm member and a seat arm member are attached to said back frame member and said seat frame member respectively by welding or caulking to connect both through a reclining adjuster.

4. The seat structure according to claim 3,
   wherein said reclining adjuster is attached to both said back arm member and said seat arm member by welding or caulking.

5. The seat structure according to claim 1,
   wherein a slide adjuster for moving said seat frame member back and forth along a rail member fixed on a support floor surface is attached to said seat frame member and/or said seat arm member by welding or caulking.

6. The seat structure according to claim 1,
   wherein said back frame member is formed in a shape of a frame having a lower frame portion disposed to run between lower portions of said pair of side frame portions, and a space portion above said lower frame portion for permitting said back cushioning member to protrude further to the rear than said lower frame portion.

7. The seat structure according to claim 1, wherein said cushioning member is formed of a three-dimensional net member formed by connecting together a pair of ground knitted fabrics disposed apart from each other using connecting fibers, or a structure with urethane comprising a two-dimensional fabric or a two-dimensional knitting and a urethane layer layered on the two-dimensional fabric or the two-dimensional knitting.

8. The seat structure according to claim 1, wherein at least a part of said cushioning member is provided in a state of contracting in a tangential direction of said cushioning member in a normal state, and upon receipt of an impact vibration or an impact force at a predetermined magnitude or more, the contraction state of said cushioning member is released.

* * * * *